(12) United States Patent
Zhou et al.

(10) Patent No.: US 12,316,424 B2
(45) Date of Patent: May 27, 2025

(54) CENTRALIZED BEAM DETERMINATION FOR FULL DUPLEX COMMUNICATIONS

(71) Applicant: QUALCOMM Incorporated, San Diego, CA (US)

(72) Inventors: Yan Zhou, San Diego, CA (US); Hemant Saggar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 18/193,514

(22) Filed: Mar. 30, 2023

(65) Prior Publication Data

US 2024/0333363 A1    Oct. 3, 2024

(51) Int. Cl.
*H04B 7/06* (2006.01)
*H04L 5/14* (2006.01)
*H04W 72/542* (2023.01)

(52) U.S. Cl.
CPC ............ *H04B 7/0695* (2013.01); *H04L 5/14* (2013.01); *H04W 72/542* (2023.01)

(58) Field of Classification Search
CPC ......... H04B 7/0695; H04B 7/088; H04L 5/14; H04W 72/542
See application file for complete search history.

(56) References Cited

U.S. PATENT DOCUMENTS

| | | | |
|---|---|---|---|
| 2018/0152921 A1* | 5/2018 | Jung | H04W 72/04 |
| 2019/0158162 A1* | 5/2019 | Ryu | H04B 7/088 |
| 2021/0126694 A1* | 4/2021 | Abedini | H04W 24/10 |
| 2021/0351838 A1 | 11/2021 | Zhang et al. | |
| 2022/0069884 A1 | 3/2022 | Zhang et al. | |

OTHER PUBLICATIONS

International Search Report and Written Opinion—PCT/US2024/018349—ISA/EPO—Jul. 3, 2024.

* cited by examiner

*Primary Examiner* — Vineeta S Panwalkar
(74) *Attorney, Agent, or Firm* — Patterson + Sheridan, L.L.P.

(57) ABSTRACT

Certain aspects of the present disclosure provide techniques for centralized beam determination for full duplex (FD) communications. An example method, performed by a wireless node, includes obtaining at least one report indicating information regarding candidate beams, selecting, from the candidate beams, a pair of beams based on the information, and outputting, for transmission, signaling indicating that at least one user equipment (UE) is to use the pair of beams for full duplex (FD) wireless communications on a first link and a second link.

33 Claims, 39 Drawing Sheets

CENTRALIZED BEAM DETERMINATION FOR FULL DUPLEX COMMUNICATIONS

BACKGROUND

Field of the Disclosure

Aspects of the present disclosure relate to wireless communications, and more particularly, to techniques for determining beams for full duplex (FD) communications.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communication at a wireless node. The method includes obtaining at least one report indicating information regarding candidate beams; selecting, from the candidate beams, a pair of beams based on the information; and outputting, for transmission, signaling indicating that at least one user equipment (UE) is to use the pair of beams for full duplex (FD) wireless communications on a first link and a second link.

Another aspect provides a method of wireless communication at a wireless node. The method includes obtaining signaling indicating a pair of beams that the wireless device is to use for FD wireless communications on a first link and a second link; and communicating using the pair of beams in accordance with the signaling.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
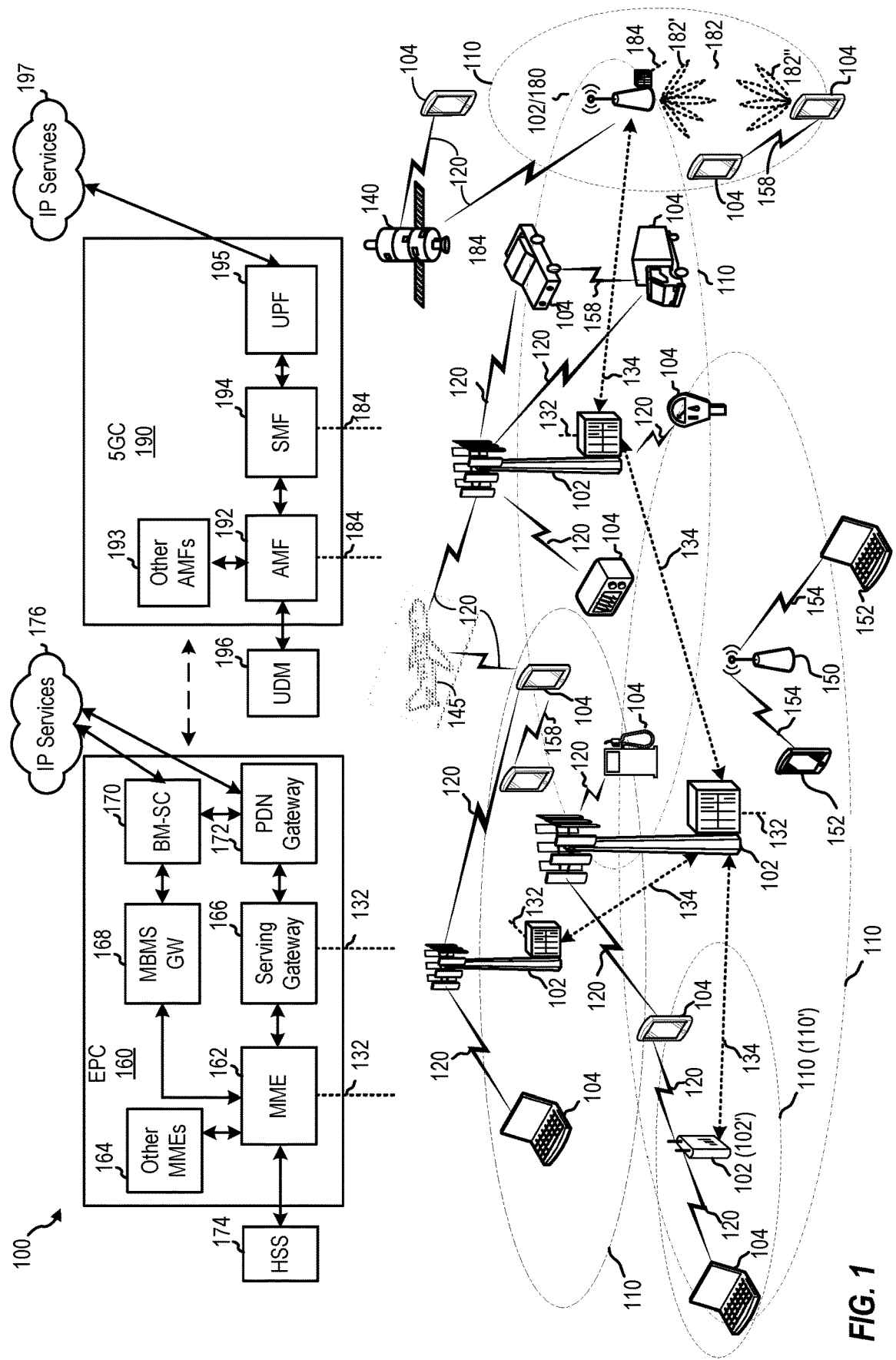
FIG. 1 depicts an example wireless communications network.

Aspects of the present disclosure provide apparatuses, methods, processing systems, and computer-readable mediums for determining beams for full duplex (FD) communications. The techniques proposed herein provide for centralized FD beam management at a wireless node. As used herein, the term wireless node generally refers to any type of device capable of wireless communications, such as a UE or a network entity, such as a base station (e.g., a gNB). The terms wireless node and wireless device may be used interchangeably.

FD communication refers to the ability of a device to simultaneously transmit and receive data. This means that, for example, two FD devices can communicate with each other in real-time without any interruption or delay caused by the need to switch between transmitting and receiving modes. In contrast to half duplex (HD) communication, in which devices may take turns transmitting and receiving data, full duplex communication allows for more efficient use of available bandwidth and faster data transfer rates. It also enables real-time applications such as voice and video communication to be more seamless and reliable.

Sidelink (SL) communication specifically refers to direct communication between two devices, for example, without the need for an intermediary base station or access point. This type of communication is often used in peer-to-peer scenarios such as device-to-device communication, such as vehicle-to-vehicle (V2V) or vehicle-to-everything (V2X) communication for autonomous driving applications.

Beamforming generally refers to a technique used to improve the signal-to-noise ratio of received signals by focusing transmitted signals to specific locations using directional beams. Beam determination for FD SL communication presents potential problems. For example, FD SL communication may cause self-interference (SI) and/or cross-link interference (CLI), negatively impacting accuracy of beam determination. Additionally, beam determination processes may be complex, requiring significant computational resources, which may result in delays or erroneous beam determination.

Aspects of the present disclosure provide techniques for beam determination for FD communications, including in SL. For example, techniques disclosed herein may allow a centralized node (e.g., a network entity, gNB, Operations, Administration and Maintenance (OAM) entity, or UE) to initiate/coordinate beam measurement and/or reporting to identify FD beams and signal the determined FD beams to one or more FD nodes. For example, a network entity may coordinate beam measurement and reporting from two FD UEs (e.g., SL FD UEs), determine FD beams, and signal the determined FD beams to the two FD UEs to use for transmitting and receiving signals (e.g., SL FD communications).

These techniques may be applied, for example, to a scenario involving a FD SL UE relay (e.g., relaying signals between a network entity and a remote UE in forward or reverse directions) or a scenario involving bi-directional FD communications between two sidelink UEs. The centralized beam determination in such scenarios may prevent/reduce SI and/or CLI, improving beam determination and quality of experience (QoE) for users.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
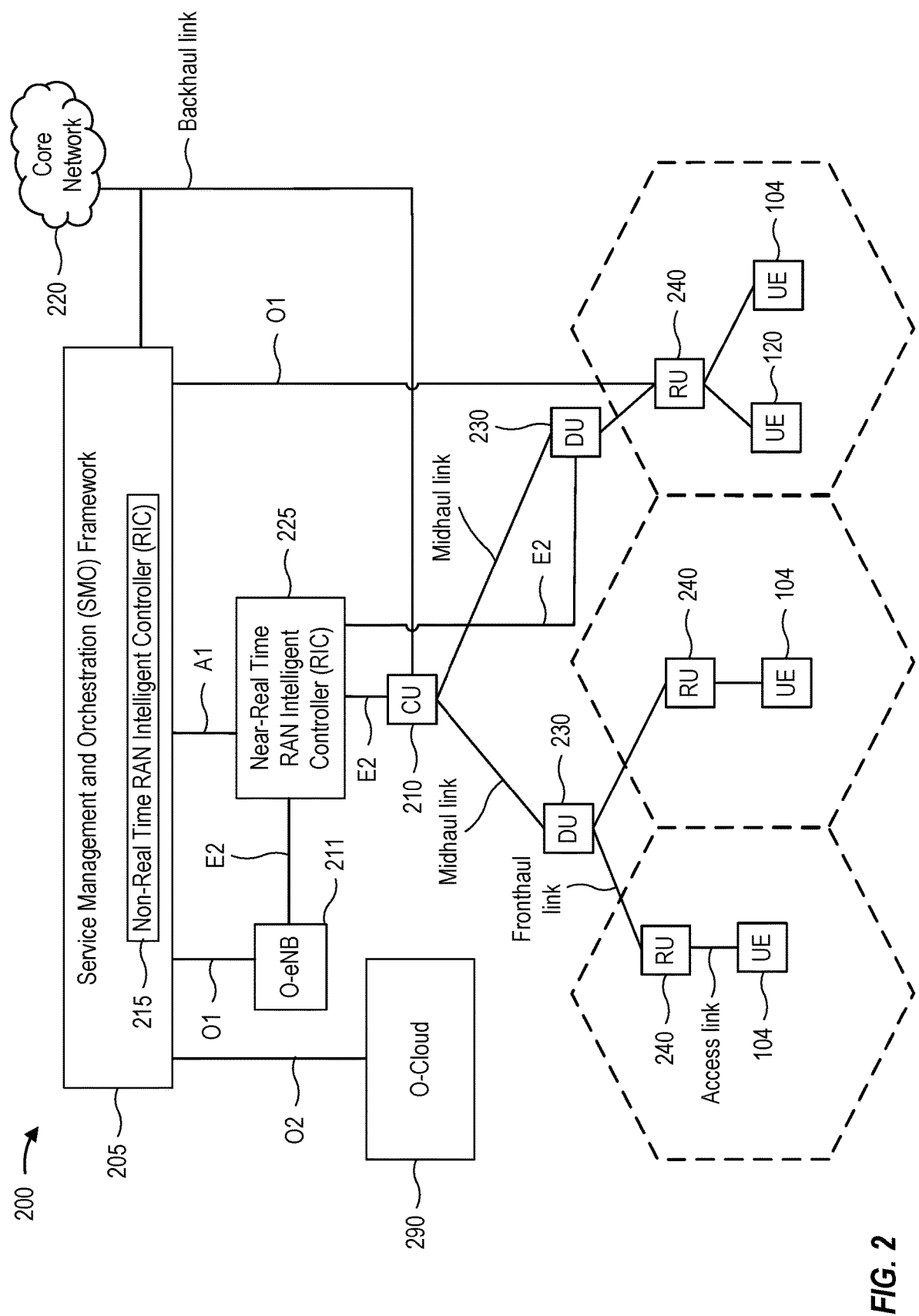
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
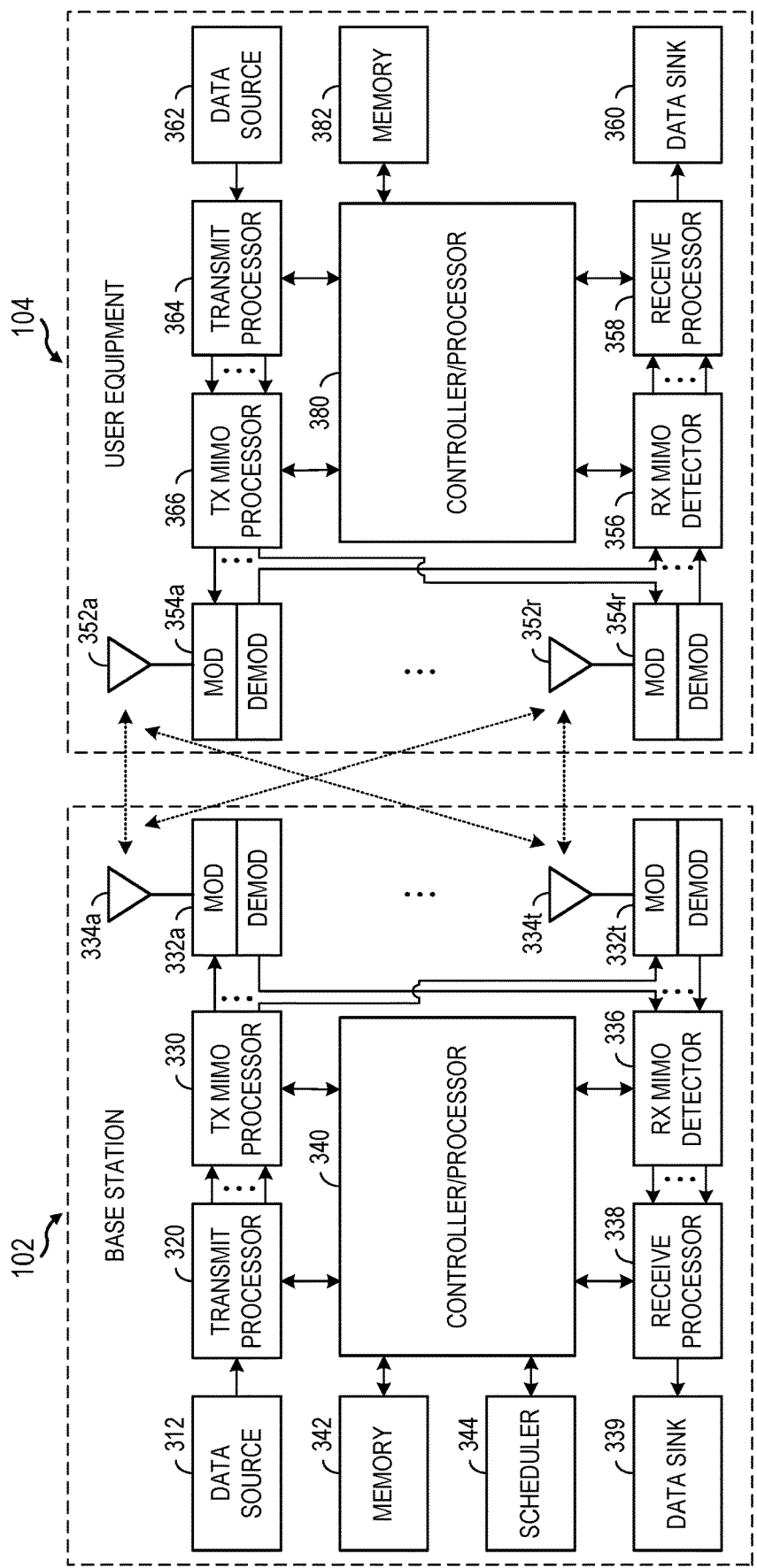
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
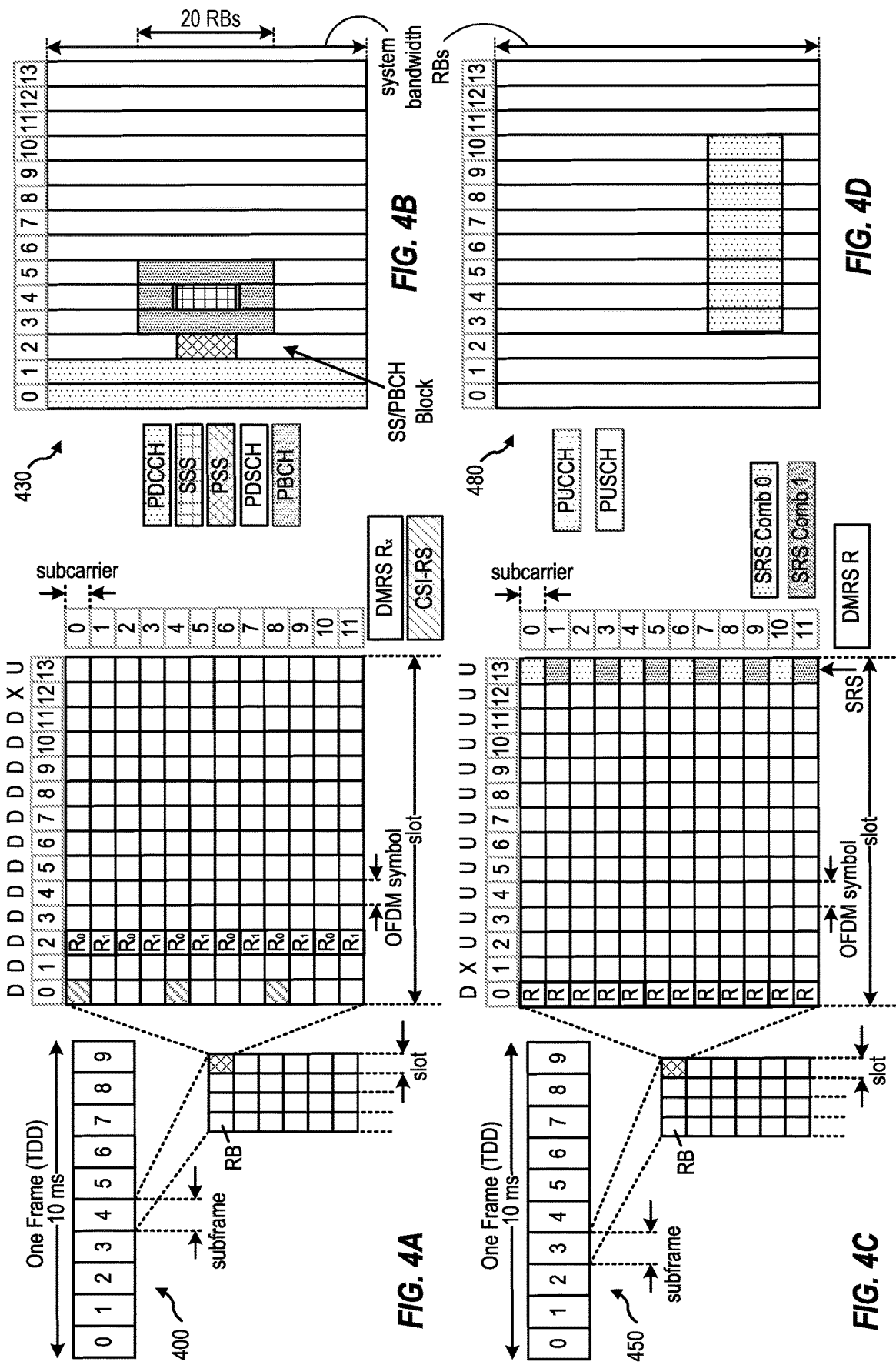
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 as.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Sidelink Communications

User equipments (UEs) communicate with each other using sidelink signals. Real-world applications of sidelink communications may include UE-to-network relaying, vehicle-to-vehicle (V2V) communications, vehicle-to-everything (V2X) communications, Internet of Everything (IoE) communications, IoT communications, mission-critical mesh, and/or various other suitable applications.

A sidelink signal refers to a signal communicated from one UE to another UE without relaying that communication through a scheduling entity (e.g., UE or a network entity), even though the scheduling entity may be utilized for scheduling and/or control purposes. In some examples, the sidelink signal is communicated using a licensed spectrum (e.g., unlike wireless local area networks, which typically use an unlicensed spectrum). One example of sidelink communication is PC5, for example, as used in V2V, long term evolution (LTE), and/or new radio (NR).

Various sidelink channels are used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH carries discovery expressions that enable proximal UEs to discover each other. The PSCCH carries control signaling such as sidelink resource configurations, resource reservations, and other parameters used for data transmissions. The PSSCH carries data transmissions. The PSFCH carries a feedback such as acknowledgement (ACK) and/or negative ACK (NACK) information corresponding to transmissions on the PSSCH.

In some NR systems, a two stage sidelink control information (SCI) is supported. The two stage SCI includes a first stage SCI (e.g., SCI-1) and a second stage SCI (e.g., SCI-2). The SCI-1 includes resource reservation and allocation information. The SCI-2 includes information that can be used to decode data and to determine whether a UE is an intended recipient of a transmission. The SCI-1 and/or the SCI-2 may be transmitted over a PSCCH.

V2X generally refers to a vehicular technology system that enables vehicles to communicate with traffic and an environment around them using short-range wireless signals, known as sidelink signals. V2X systems typically provide two complementary transmission modes. A first transmission mode involves direct communications (e.g., also referred to as sidelink communications) between participants in proximity to one another in a local area. A second transmission mode, involves network communications through a network, which may be implemented over a Uu interface (for example, a wireless communication interface between a radio access network (RAN) and a UE).

In the first transmission mode, a vehicle can have a wireless communication link with an individual through a PC5 interface. Communications between the vehicles may also occur through a PC5 interface. In a like manner, communication may occur from the vehicle to other highway components, such as a roadside unit (RSU), which may be a traffic signal or sign through a PC5 interface. With respect to each communication link, two-way communication may take place between devices, therefore each device may be a transmitter and a receiver of information. The V2X system may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

In the second transmission mode, communication between vehicles may occur through a network entity. Network communications may occur through discrete nodes, such as a network entity that sends and receives information to and from (e.g., relays information between) the vehicles. The network communications through vehicle to network (V2N) links may be used, for example, for long-range communications between the vehicles, such as for communicating the presence of a car accident a distance ahead along a road or highway. Other types of communications may be sent by a wireless node to the vehicles, such as traffic flow conditions, road hazard warnings, environmental/weather reports, and service station availability, among other examples. Such data can be obtained from cloud-based sharing services.

Overview of Sidelink Resource Allocation Modes

Resources for sidelink communications may be allocated using different sidelink allocation modes, such as sidelink resource allocation mode 1 (herein as Mode 1) and sidelink resource allocation mode 2 (herein as Mode 2). For example, in Mode 1 operation, a network entity, such as a base station, indicates to a sidelink UE which resources to use to communicate (e.g., receive or transmit) a sidelink transmission. In Mode 2 operation, the sidelink UE identifies and selects the resources for the sidelink transmissions on its own (e.g., without the assistance of the network entity), for example, based on channel sensing.

In Mode 1 operation, the resources that the sidelink UE may use to transmit may be dynamically scheduled in a downlink control information (DCI) message, such as a DCI 3_0 message. The DCI message may include a time resource assignment, indicating which slot the sidelink transmit user equipment can use to transmit a sidelink transmission. The time resource assignment may indicate up to three sidelink slots, the first of which may be an initial transmission, and the second and third of which may be retransmissions.

Additionally, the DCI message also includes a frequency resource assignment, indicating where in the frequency spectrum the sidelink UE can transmit the sidelink transmission.

In addition to the DCI message, sidelink control information (SCI) may also contain a time resource assignment. The SCI time resource assignment may be used by a sidelink user equipment to indicate to another sidelink user equipment (e.g., a receiving sidelink user equipment) which slot it will use to make the sidelink transmission.

In Mode 2 operation, as noted above, a sidelink transmitter UE determines which resources it will use for the sidelink transmission, for example, based on channel sensing. Once the sidelink transmitter UE determines which resources to use, the sidelink transmitter UE may include that information in the time resource assignment of the SCI to indicate to a sidelink receiver UE in which slots to expect to receive sidelink transmissions.

In addition to the time resource assignment, the SCI may also include a resource reservation period. The resource reservation period can be used to reserve multiple slots at configurable periodicities. The reserved slots may be used for new, future transmissions.

In some cases, two UEs communicating on sidelink may not be using a same sidelink mode (e.g., Mode 1 or Mode 2). For example, a receive UE may be oblivious to the (different/same) mode used by a transmitting UE. For sidelink Mode 1 and Mode 2, sidelink resource pools may be pre-configured by the network.

Overview of Full Duplex (FD)
Vehicle-to-Everything (V2X) Communications

Figure 5:
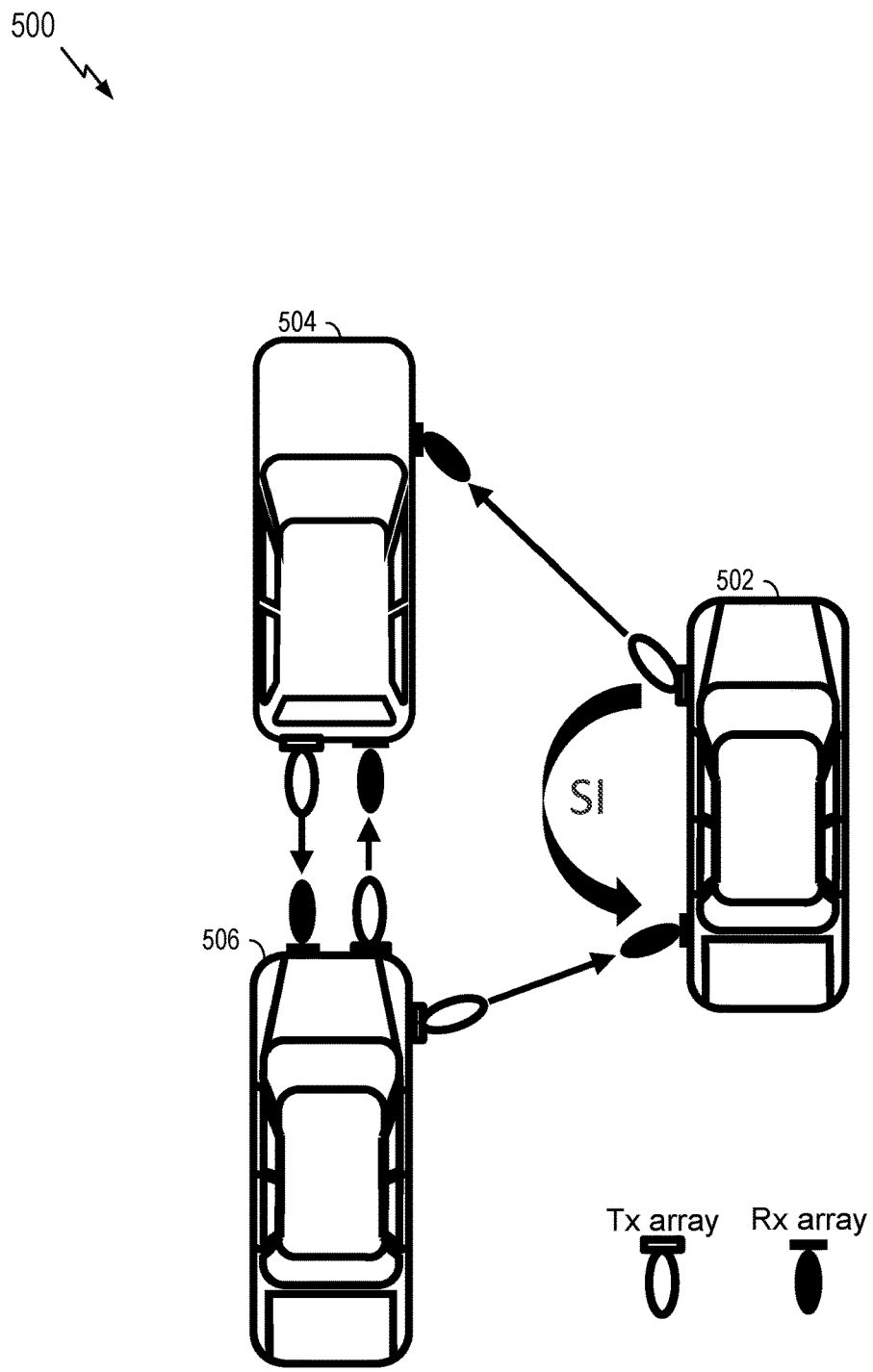
FIG. 5 depicts an example scenario involving full duplex (FD) vehicle to everything (V2X) communications.

FIG. 5 depicts an example scenario 500 involving full duplex (FD) vehicle to everything (V2X) communications. As illustrated, each FD vehicle (502, 504, 506) may include at least one transmit (Tx) array and at least one receive (Rx) array. As shown in the scenario illustrated in FIG. 5, self-interference (SI) may be a significant concern. For example, as illustrated, a transmission from vehicle 502 to vehicle 504 may cause SI while vehicle 502 is receiving signals from vehicle 506. SI in such a scenario may reduce efficiency and efficacy of reception by the Rx array of vehicle 502.

In some cases, spatial isolation mechanisms may be used in an effort to mitigate the impact of SI. In such cases, 80-90 dB spatial isolation may be achieved in FD communications between two panels/arrays (e.g., operating at 28 GHz), which may help to reduce SI. In the case of vehicle-to-everything (V2X) communications, a vehicle or roadside unit (RSU), such as the vehicles 502, 504, and 506 illustrated in FIG. 5, may have enough space to ensure sufficient spatial isolation between transmitting panels/arrays and receiving panels/arrays. In some cases, SI may be further reduced due to larger beamforming gain with more antenna elements per panel/array (e.g., in frequency range 2 (FR2) or other frequency ranges).

Aspects Related to Centralized Beam
Determination for FD Communications

Aspects of the present disclosure provide techniques for beam determination for FD communications, including in SL. For example, techniques disclosed herein may allow a centralized node (e.g., a gNB, OAM, or UE) to identify suitable FD beams and signal the identified FD beams to one or more FD nodes. For example, such a centralized node may coordinate beam measurement and reporting from two FD UEs (e.g., SL FD UEs), determine FD beams, and signal the determined FD beams to the two FD UEs to use for transmitting and receiving signals (e.g., SL FD communications).

According to certain aspects of the present disclosure, a centralized node may manage FD beams in a first scenario (Scenario 1) involving a forward relay direction, and a second scenario (Scenario 2) involving a reverse relay direction, as well as a bi-directional FD SL communications scenario. In these scenarios, which will be discussed in further detail below, beams may be identified by a measured beam identifier (ID), a measured link, or node ID in scenarios involving non-beamforming based communications (e.g., frequency range 1 (FR1)).

Figure 6:
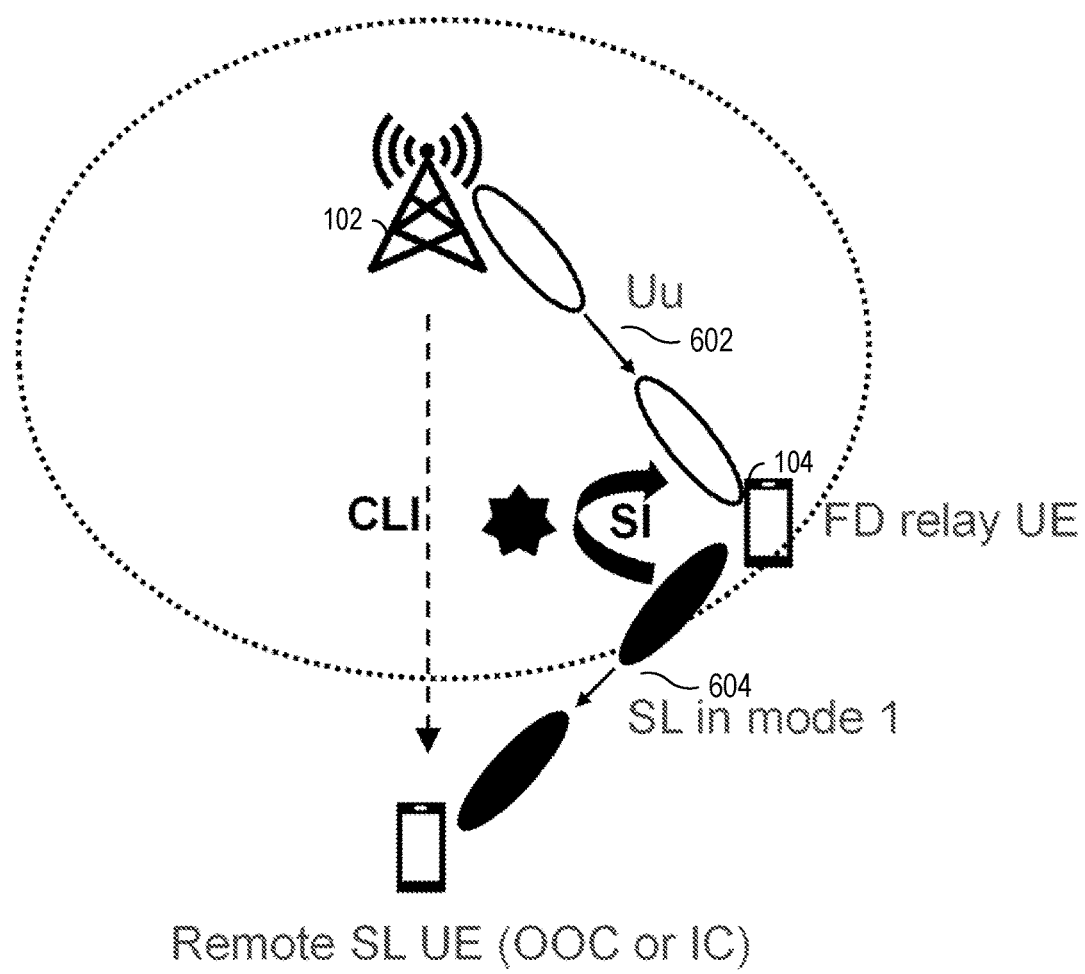
FIG. 6 depicts an example scenario (Scenario 1) involving a forward relay direction.

FIG. 6 depicts an example scenario 600 (Scenario 1), which involves an FD sidelink (SL) relay UE 104 between a network entity (e.g., a gNB) 102 and a remote SL UE. As noted above, Scenario 1 is related to an operational direction of an FD relay UE from a network entity to a remote UE (e.g., which may be referred to as a "forward direction" of the relay). In other words, as shown, an air/radio interface (e.g., Uu) link 602 may be formed from a network entity to the relay UE, and an SL (e.g., SL mode 1) link 604 may be formed from the relay UE to a remote SL UE (e.g., which may be out of coverage (OOC) or in coverage (IC) of the network). In this scenario, the relay UE may perform FD communications with Uu reception and SL transmission.

As illustrated in FIG. 6, SI may occur at the FD relay UE, and CLI may occur between the gNB and the remote SL UE. Aspects of the present disclosure, however, provide techniques that may allow a gNB to act as a centralized beam manager. For example, the gNB may determine the beams in both Uu and SL to minimize the self-interference (SI) at the FD relay UE as well as the cross-link interference (CLI) from the gNB to the remote SL UE. In contrast, in conventional relay UE assisted design, the FD relay UE may autonomously initiate measurement and may determine the Uu and SL beams for the FD relay, which may be reported to the network.

Figure 7:
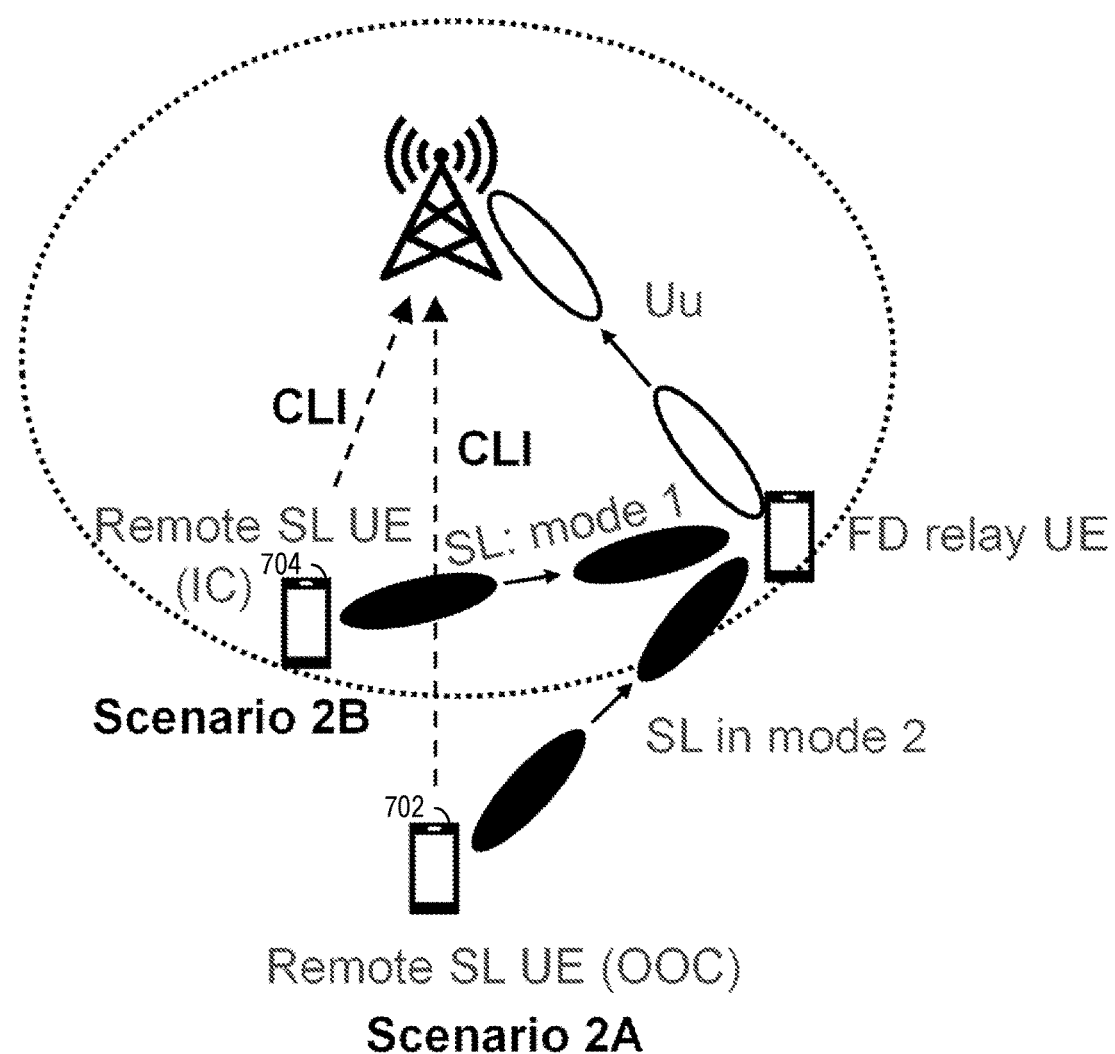
FIG. 7 depicts an example scenario (Scenario 2) involving a reverse relay direction.

FIG. 7 depicts an example scenario 700 (Scenario 2) involving the reverse relay direction, from the remote UE to the network entity. In other words, an SL (e.g., SL mode 1 or SL mode 2) link may be formed from a remote SL UE (e.g., which may be OOC or IC of the network) to the relay UE and a Uu link may be formed from the relay UE to a network entity. In this scenario, the relay UE may perform FD communications with SL reception and Uu transmission.

The second scenario may be further divided into two sub-scenarios based on whether remote SL UE is in coverage (IC) or out of coverage (OOC) of the network area served by the gNB, as illustrated in FIG. 7. Scenario 2A may refer to a scenario where the remote SL UE 702 is OOC and the relay provides coverage extension. In Scenario 2A, the link from remote UE to relay UE may be in SL mode 2. Scenario 2B may refer to a scenario where the remote SL UE 704 is IC and the relay provides UL throughput enhancement. In Scenario 2B, the link from remote UE to relay UE may be in SL mode 1.

In Scenario 2, aspects of the present disclosure provide techniques that may allow the gNB to determine the beams in both Uu and SL to minimize the self-interference (SI) at the FD relay UE as well as the cross-link interference (CLI) from remote SL UE to the gNB.

Figure 8:
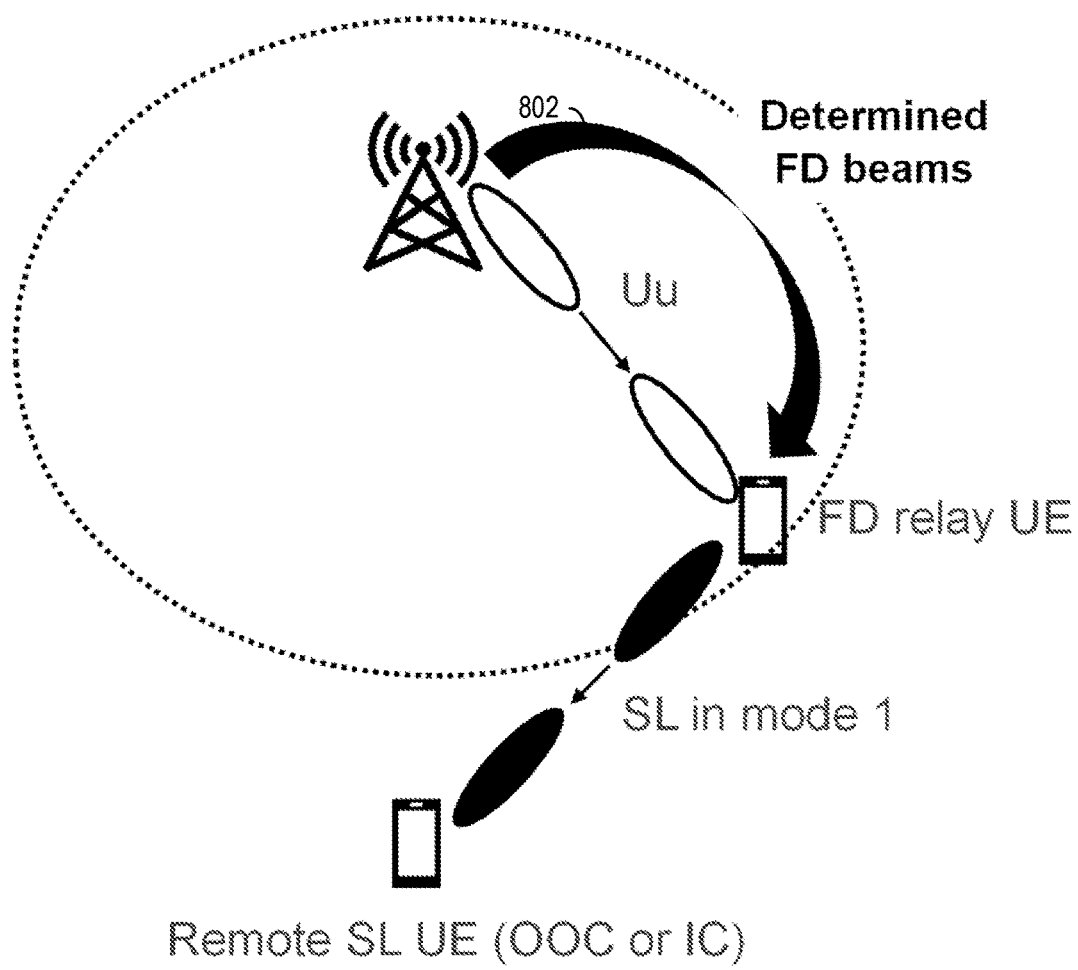
FIGS. 8-10 depict examples of Scenario 1, in accordance with certain aspects of the present disclosure.
Figure 9:
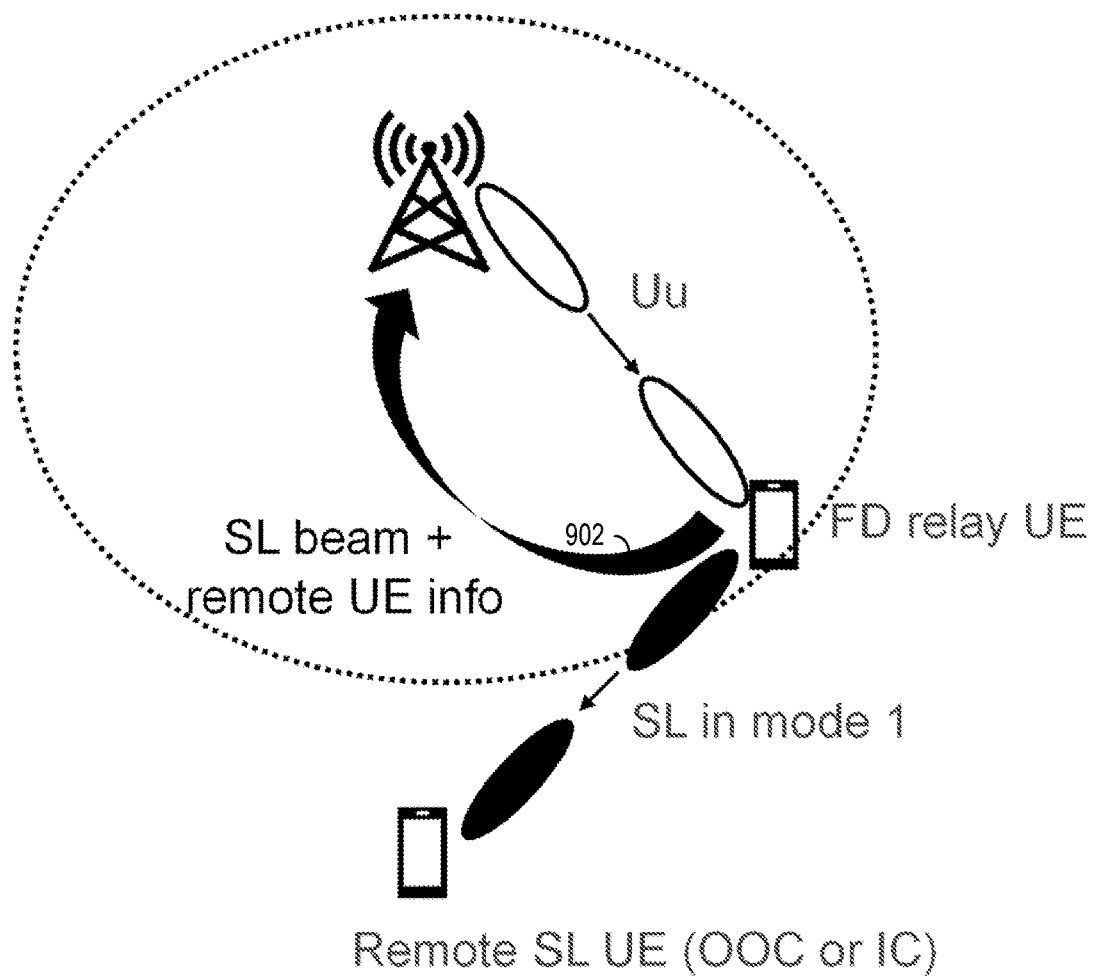
Figure 10:
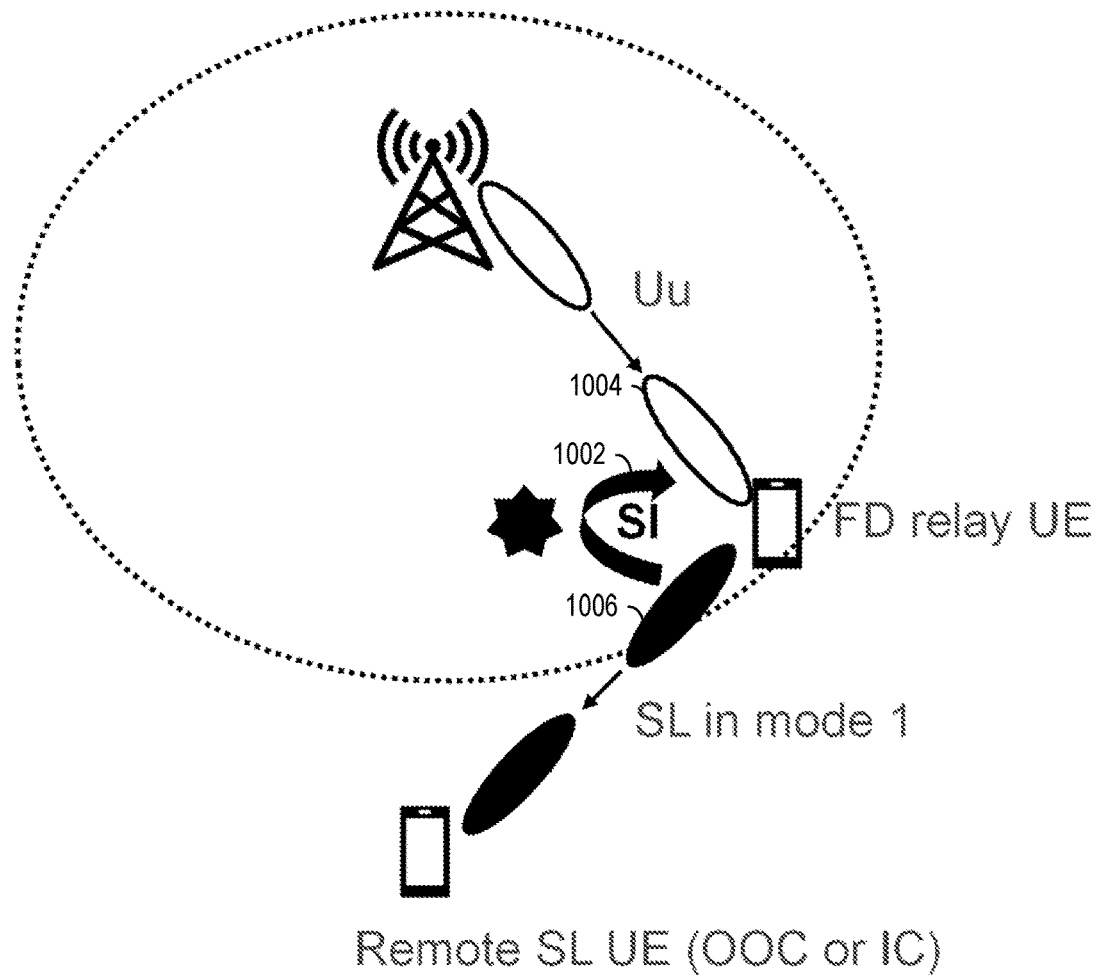

FIGS. 8-10 depict examples deployments 800, 900, and 1000 of Scenario 1, in accordance with certain aspects of the present disclosure.

As noted above, according to certain aspects of the present disclosure, a network entity (e.g., a gNB) may initiate/coordinate beam measurement/reporting to identify/select/determined FD beams for the relay UE in the forward direction. According to certain aspects, in Scenario 1, as a centralized design, the gNB may determine the beams in both, the air/radio interface (e.g., Uu) link and the SL link, in order to minimize the SI at the FD relay UE as well as the CLI from the gNB to the remote SL UE. As illustrated at 802 in FIG. 8, once the beams are determined, the gNB may signal the determined Uu and SL FD beams to the relay UE.

In some aspects, in order to determine the FD Uu and SL beams for the relay UE, the gNB may inform the relay UE of which SL beam(s) for which remote SL UE should be measured, in case the relay UE is serving multiple remote UEs. In some aspects, in order to minimize CLI from the gNB to the remote SL UE, the gNB may send a request to the remote UE for a beam report (e.g., especially when the gNB cannot reliably reach the remote UE but still can affect it with CLI). In some aspects, this request may be sent via the relay UE.

For the gNB to configure beam measurement for FD beam selection at the relay UE, the gNB may benefit from information regarding the SL beams used at the relay UE for the intended remote UE. As illustrated at 902 in FIG. 9, according to certain aspects of the present disclosure, a relay UE may provide information regarding candidate SL beams and the corresponding remote UE identity to the gNB in order to facilitate the gNB to schedule FD beam measurement.

In some aspects, the relay UE may report to the gNB the candidate SL transmit (Tx) and/or receive (Rx) beam IDs and associated remote UE ID (e.g. top X best SL Tx and/or Rx beams in half-duplex (HD) mode). In some aspects, the SL Tx/Rx beam ID may be represented by a SL Tx/Rx transmission configuration indicator (TCI) state ID. In some aspects, the remote UE ID may be represented by a Layer 1 (L1) and/or Layer 2 (L2) SL UE ID. In some cases, the report may be autonomously sent, periodically (P)/semi-persistently (SP)/or aperiodically (AP) scheduled, or event triggered (e.g., when a top X number best SL Tx and/or Rx beams change by a threshold amount or link quality metrics measured on the top X best SL Tx and/or Rx beams change by a threshold amount).

As noted above, SI may occur at an FD device transmitting and receiving simultaneously. For example, as illustrated in FIG. 10, SI 1002 may occur at the FD relay UE. According to certain aspects of the present disclosure, a gNB may configure measurement and/or reporting for FD relay beam pair selection. For example, in some aspects, in order to select FD Uu and SL beams at a relay UE, the gNB may request the relay UE to report SI 1002 or a downlink (DL) signal to interference plus noise ratio (SINR) for a candidate pair of a SL Tx beam 1006 and a Uu Rx beam 1004.

Figure 11:
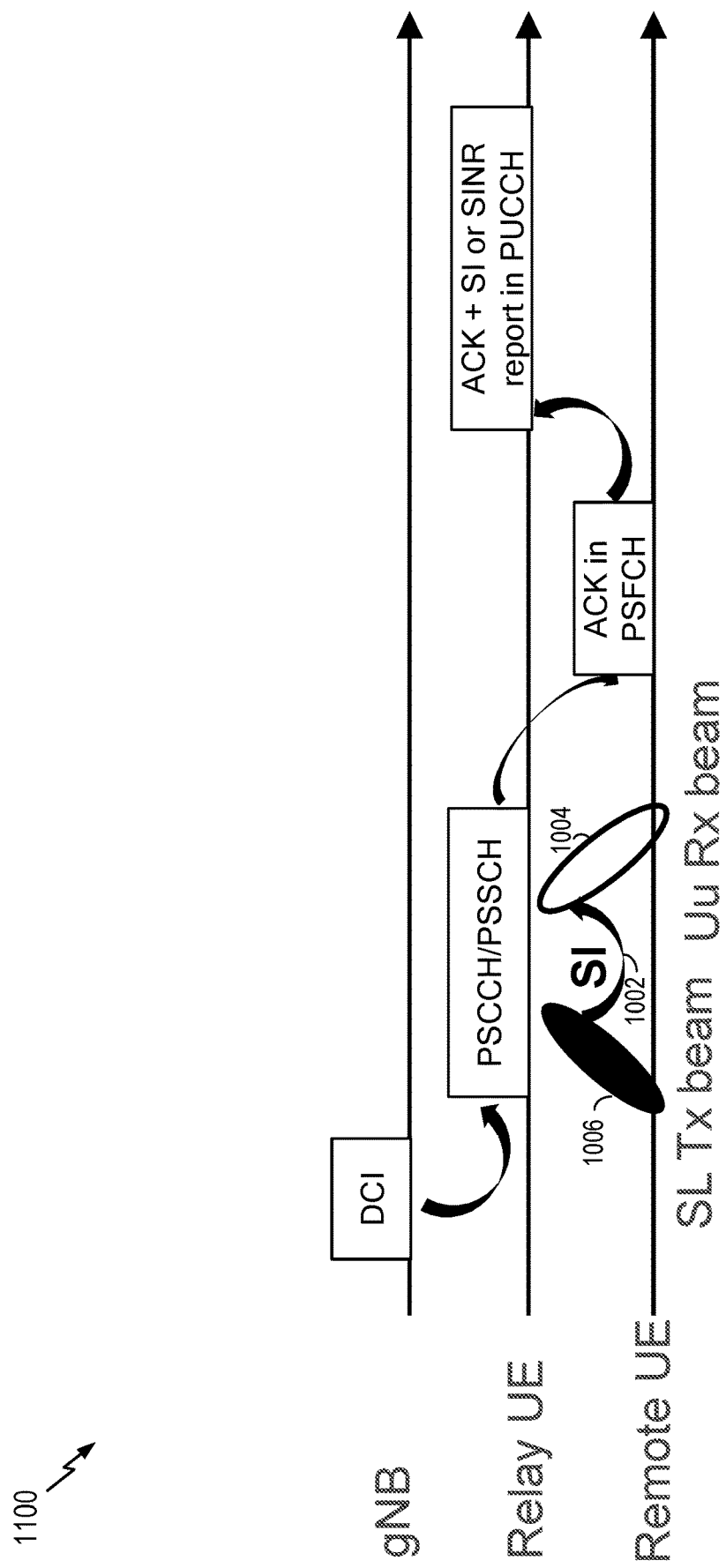
FIGS. 11-14 depict timing diagrams illustrating examples of Scenario 1, in accordance with certain aspects of the present disclosure.

In some aspects, the FD beam measurement and reporting may be based on SL traffic, as shown in the timing diagram 1100 of FIG. 11. As illustrated, the gNB may indicate (e.g., via DCI) to the relay UE to transmit SL traffic (e.g., PSCCH/PSSCH) with a particular SL Tx beam 1106 for a given remote SL UE and simultaneously measure SI 1002 associated with a particular Uu Rx beam 1004 at the relay UE. This may be contrasted with conventional SL Mode 1 operations, where detailed SL operation parameters are determined by SL UE, rather than being controlled by a gNB as proposed herein. In some aspects, SL-traffic based FD relay beam measurement reporting may be dynamically, semi-persistently, or periodically scheduled.

Figure 12:
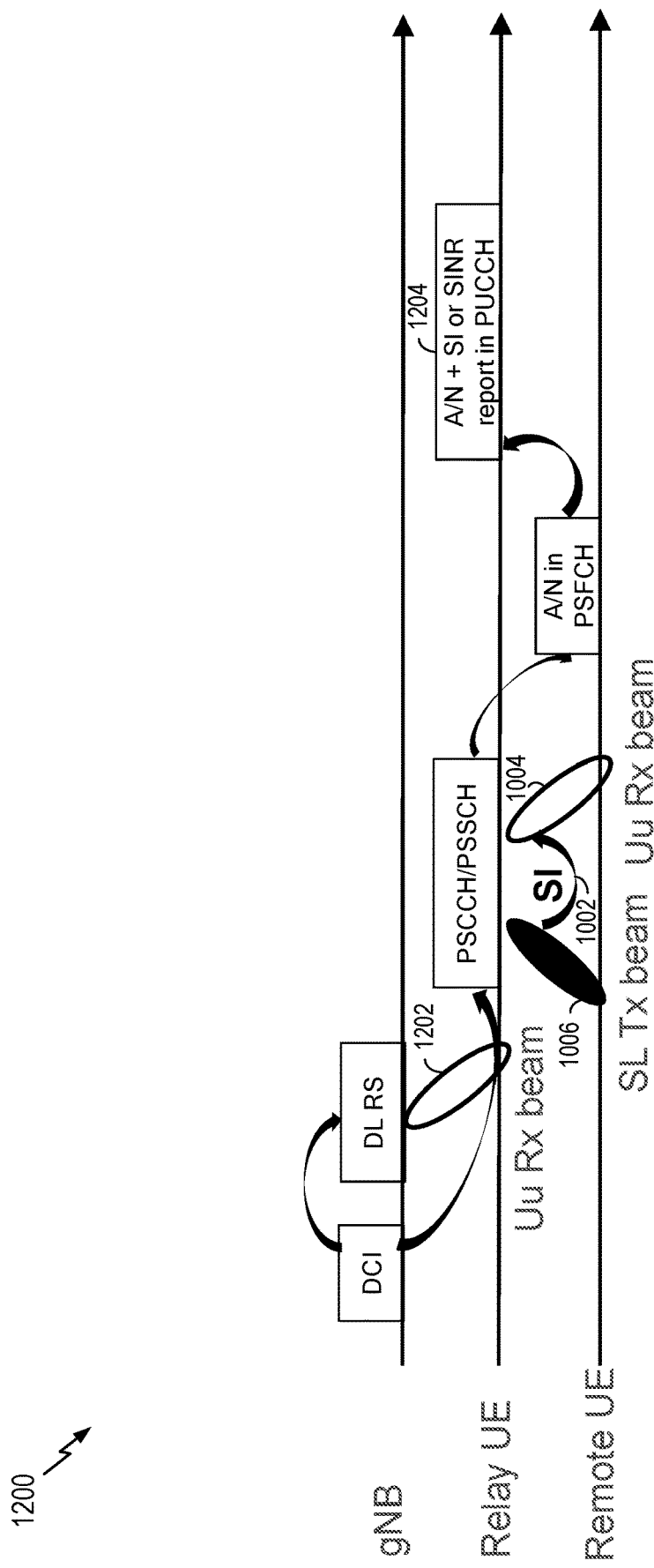

As illustrated in the timing diagram 1200 of FIG. 12, in some aspects, instead of (e.g., or in addition to) SI, the gNB may also request the relay UE to measure DL SINR of the Uu Rx beam 1004 in addition to the SI 1002 from the SL Tx beam 1006. For calculating SINR, without an additional overhead, the DL reference signal receive power (RSRP) may be measured from downlink control information (DCI) received by a desired Uu Rx beam 1202. This may be combined with the measured SI 1002 to calculate the DL SINR of the Uu Rx beam 1004 when paired with the SL Tx beam 1006.

Alternatively, for example, as illustrated in FIG. 12, the gNB may schedule dedicated DL reference signals (RS) to the relay UE (e.g., received by the desired Uu Rx beam 1202) to measure DL RSRP with the desired Uu Rx beam. In some aspects, based on the measured DL RSRP and SI, the relay UE may compute the corresponding DL SINR. In some aspects, as illustrated at 1204, the relay UE may report the SI or DL SINR in a separate report or together with acknowledgement (ACK) or negative ACK (NACK) information for the SL traffic to the gNB.

In some aspects, the gNB may also indicate a time/frequency location of a DL measurement resource (e.g. a DL bandwidth part (BWP) or DL sub-band) where the SI and/or RSRP is to be measured. By measuring the SI and/or RSRP on a smaller bandwidth, the relay UE may save power without sacrificing measurement accuracy.

Figure 13:
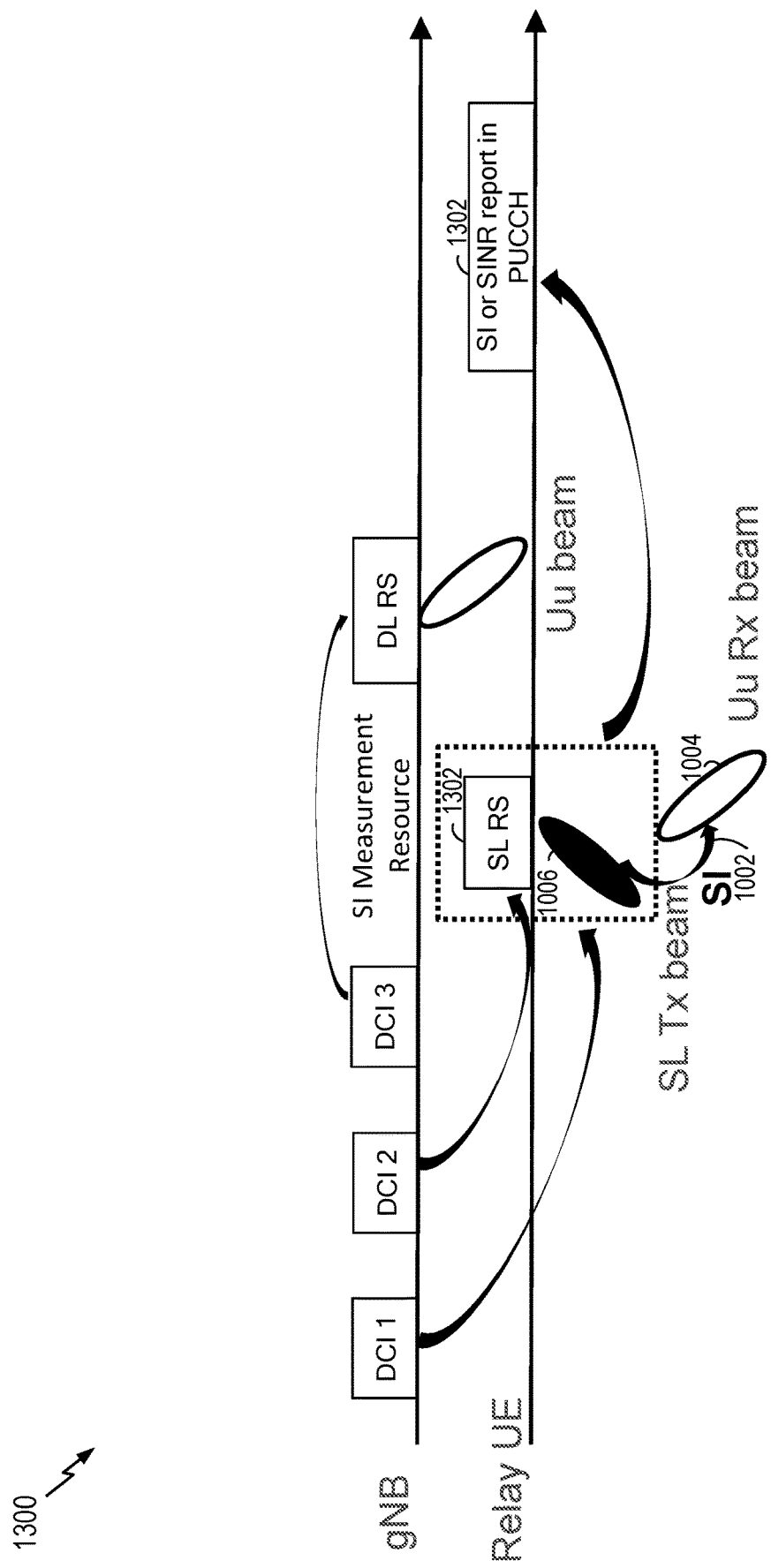

As illustrated in the timing diagram 1300 of FIG. 13, according to certain aspects of the present disclosure, the FD beam measurement/reporting may be based on dedicated RS(s), such as an SL RS 1302, in SL and Uu. For example, as illustrated in FIG. 13, in some aspects, in order to measure SI at the relay from an SL Tx beam to a Uu Rx beam at the relay UE, the gNB may schedule (e.g. via DCI 2) the relay UE to transmit an SL RS 1302 with the intended SL Tx beam 1006 while scheduling (e.g. via DCI 1) an SI measurement resource for the relay UE to measure the SI 1002 with the intended Uu Rx beam 1004.

In some aspects, as illustrated in FIG. 13, the gNB may further schedule a DL RS for the relay UE to measure the DL RSRP with the intended Uu Rx beam (e.g. via DCI 3). Relay UE may compute a corresponding DL SINR based on DL RSRP and SI. In some cases, the gNB may also schedule UL resources for the relay UE to report (e.g., via PUCCH) the measured SI or the DL SINR for the considered FD relay beam pair comprising of the SL Tx beam and the Uu Rx beam, as illustrated at 1304.

The RS based FD relay beam measurement/reporting may be dynamically, semi-persistently, or periodically scheduled. In some cases, as illustrated in the timing diagram 1400 of FIG. 14, when the measurement/reporting is dynamically scheduled, any combination of the SL RS Tx 1404, the SI measurement resource, and the DL RS 1406 can be co-scheduled by a single DCI 1402, instead of multiple respective DCIs as in the examples described above. For example, as illustrated, the DCI 1402 in FIG. 14 schedules an SL RS 1404 and a DL RS 1406.

In some aspects, the gNB may indicate the time/frequency location of the SI measurement resource (e.g. a whole DL BWP or DL sub-band), such that relay UE can measure the SI on intended DL sub-bands for potential DL traffic scheduling.

Figure 14:
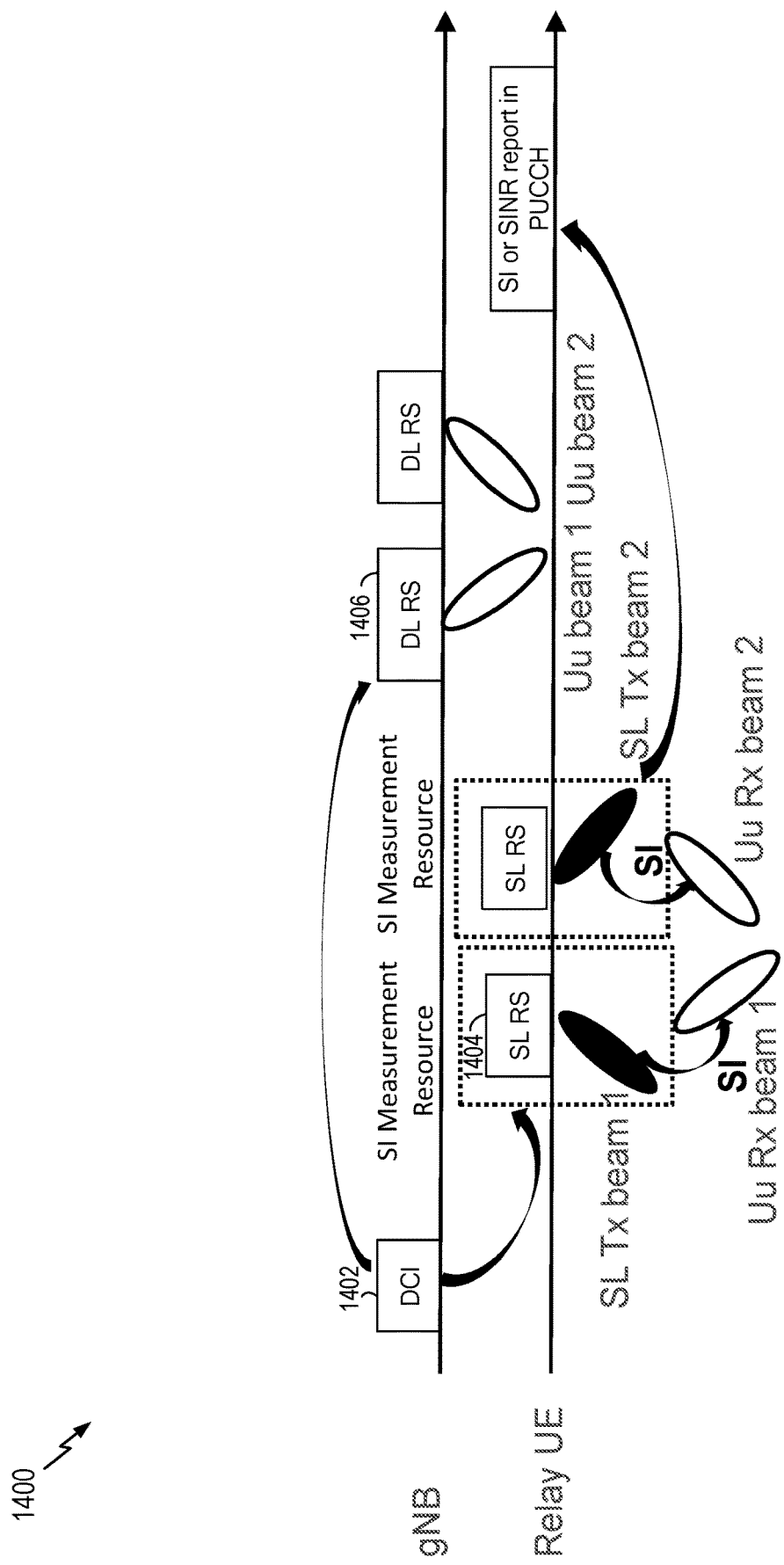

In some aspects, for a given beam report, the gNB may schedule UE to report results for multiple candidate FD Uu+SL beam pairs. For example, as illustrated in FIG. 14, the gNB may schedule the UE to report results for SL Tx beam 1+Uu Rx beam 1 and SL Tx beam 2+Uu Rx beam 2.

In some cases, UE may report the top Y best pairs for DL SINR or SI among the X total beam pairs that UE was scheduled to measure.

Figure 15:
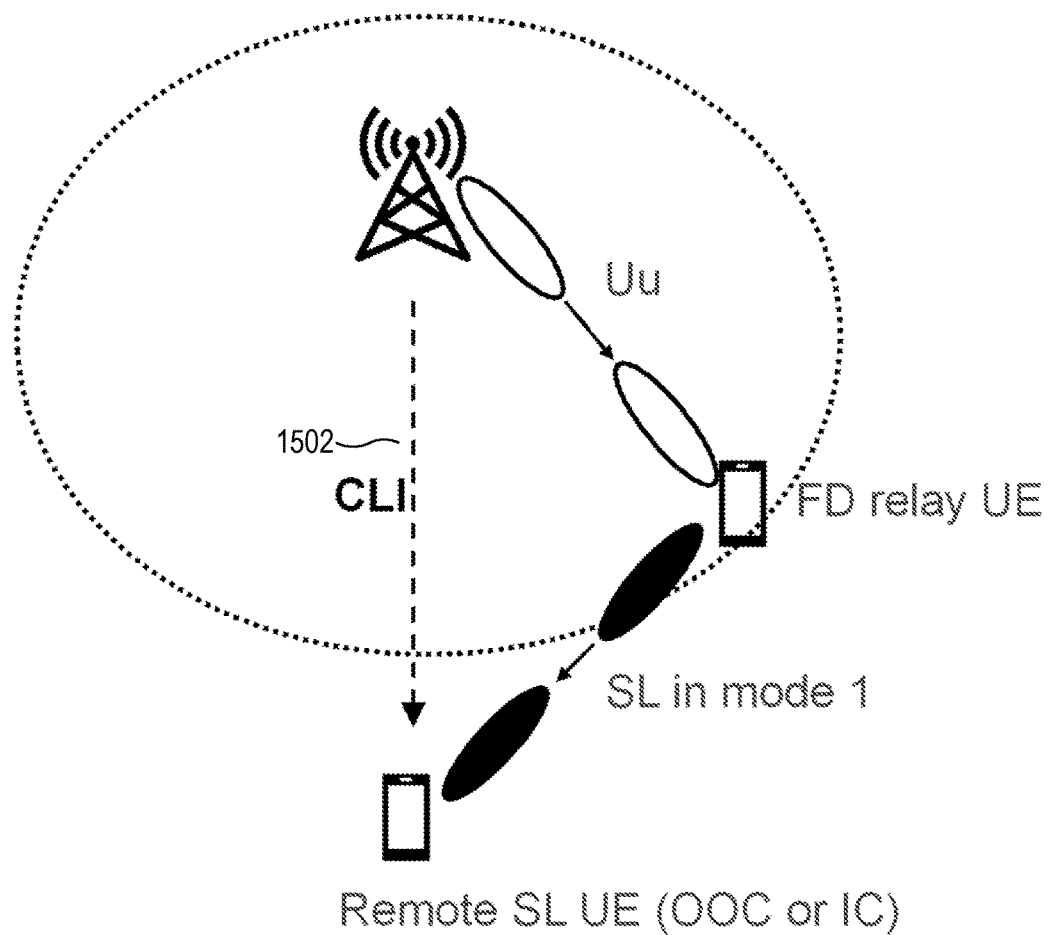
FIG. 15 depicts an example of Scenario 1, in accordance with certain aspects of the present disclosure.
Figure 16:
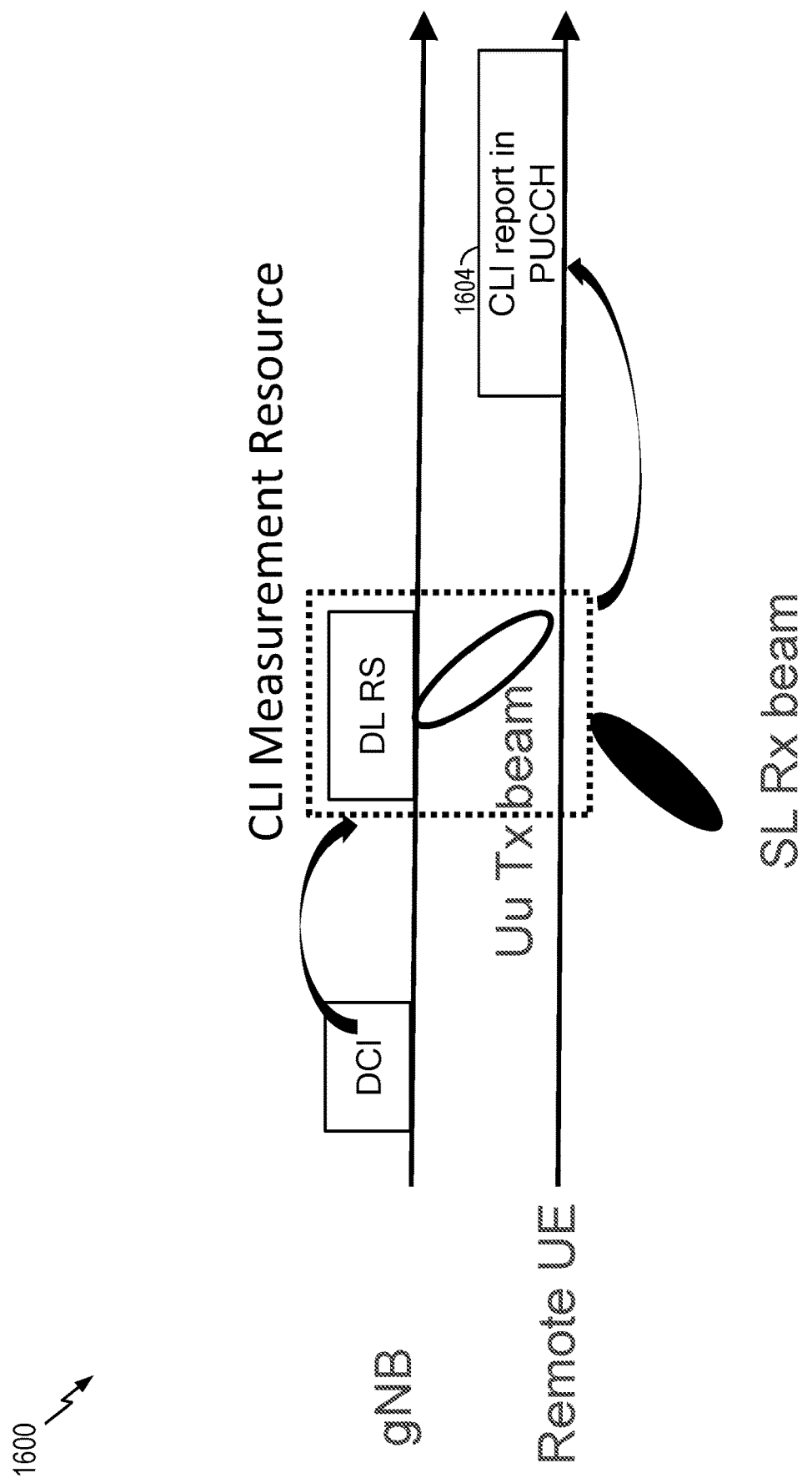
FIG. 16 depicts a timing diagram illustrating an example of Scenario 1, in accordance with certain aspects of the present disclosure.

In some cases, as illustrated in the scenario 1500 of FIG. 15, non-negligible CLI 1502 may occur at the remote UE due to the selected Uu+SL FD relay beams. In some cases, the CLI 1502 may be significant in power even if the remote UE is out of coverage of the gNB for communication purposes. According to certain aspects of the present disclosure, as illustrated in the timing diagram 1600 of FIG. 16, the gNB may configure CLI measurement resources and a beam report (e.g., a CLI report in PUCCH) 1604 from a remote SL UE to determine if the selected Uu+SL FD relay beams will cause non-negligible CLI at the remote UE.

In some cases, the remote UE may be in coverage (IC) of the network (e.g. the relay is mainly used for throughput improvement purposes). In such cases, the gNB may transmit DL RS with a selected Uu beam and request the remote UE to report corresponding CLI metrics (e.g. RSRP or Received Signal Strength Indicator (RSSI)), measured with a selected SL beam, which may be identified by a SL TCI state of the relay UE.

As noted above, the remote UE may be OOC and the relay may mainly be used for coverage improvement purposes. In such cases, the gNB's control/data may not be decoded by the remote UE, but may still cause non-negligible CLI to the remote UE. Since the remote UE cannot reliably decode control information from the gNB, the relay UE may be asked to relay the measurement/report related info between the gNB and remote UE.

Figure 17:
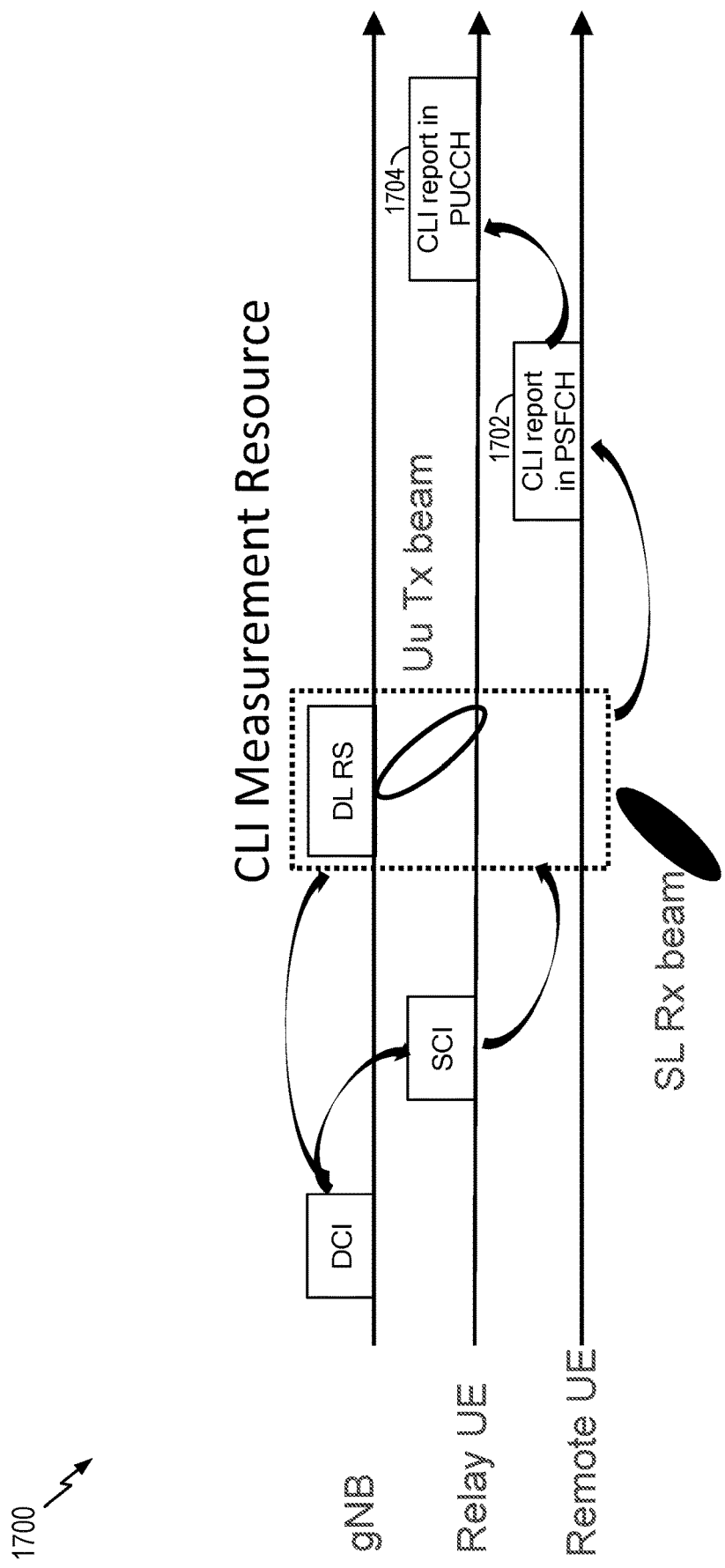
FIG. 17 depicts a timing diagram illustrating an example of Scenario 1, in accordance with certain aspects of the present disclosure.

For example, as illustrated in the timing diagram 1700 of FIG. 17, the relay UE may forward the CLI measurement resource location and SL Rx beam (e.g., provided by the gNB via DCI) to the remote UE via sidelink control information (SCI). Additionally, in some cases, the remote UE may provide a CLI report (e.g., via PSFCH) 1702, and the relay UE may forward the CLI report/measurement results to the gNB via PUCCH or PUSCH, as illustrated at 1704 in FIG. 17.

Figure 18:
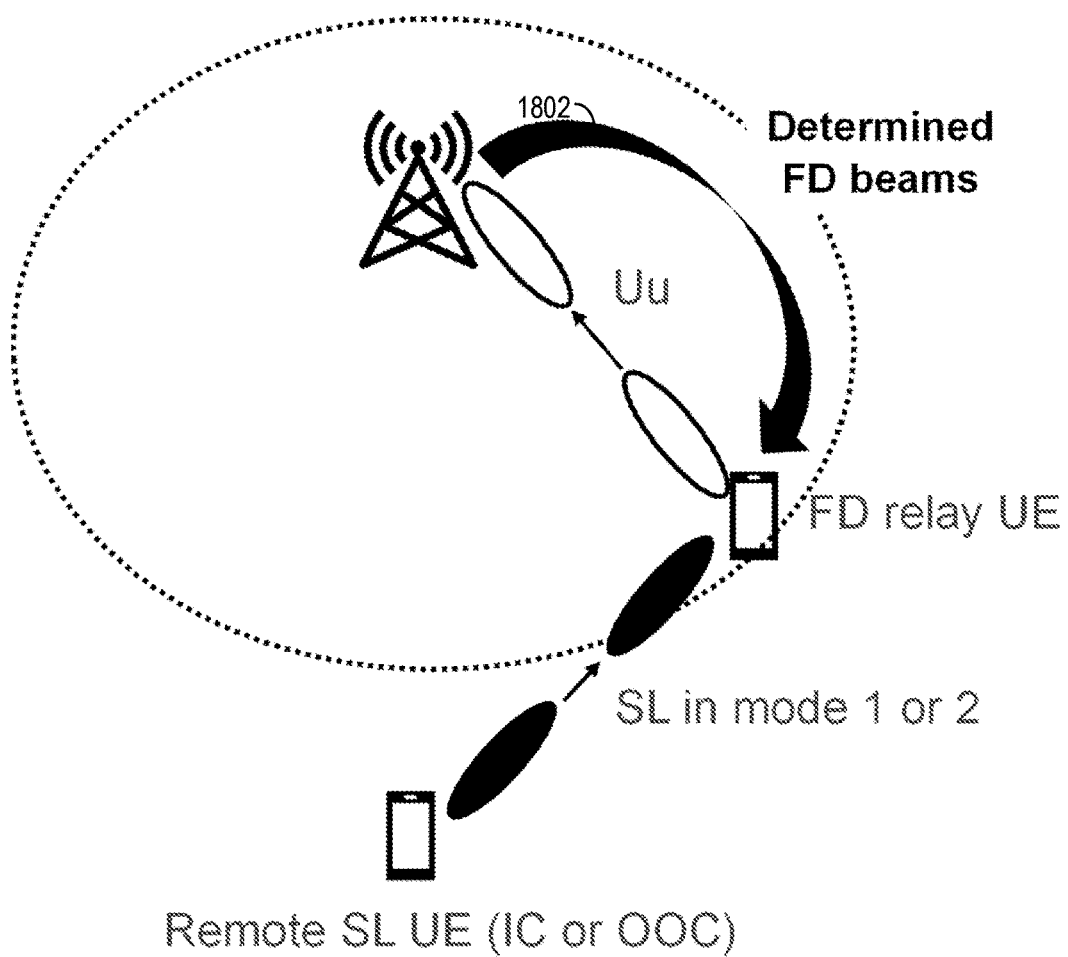
FIG. 18 depicts an example of Scenario 2, in accordance with certain aspects of the present disclosure.

FIG. 18 depicts an example 1800 of Scenario 2, in accordance with certain aspects of the present disclosure. As noted above, Scenario 2 is related to an operational direction of an FD relay UE from a remote UE to a network entity (e.g., which may be referred to as a "reverse direction" of the relay). In other words, an SL (e.g., SL mode 1 or SL mode 2) link may be formed from a remote SL UE (e.g., which may be OOC or IC of the network) to the relay UE and a Uu link may be formed from the relay UE to a network entity. In this scenario, the relay UE may perform FD communications with SL reception and Uu transmission. In Scenario 2, aspects of the present disclosure provide techniques that may allow the gNB to determine the beams in both Uu and SL to minimize the self-interference (SI) at the FD relay UE as well as the cross-link interference (CLI) from remote SL UE to the gNB.

Similar to Scenario 1 (e.g., relay forward direction) discussed above, the centralized FD relay beam selection (e.g., the gNB may determine the Uu and SL beams) may be used in the relay reverse direction (Scenario 2) to minimize SI at the FD relay UE as well as the CLI from remote SL UE to gNB. For example, the gNB may initiate/coordinate beam measurements/reports, based on which the gNB selects/determines FD beams for both Uu and SL and signals the determined FD beams for the relay UE in the reverse direction, as illustrated at 1802 in FIG. 18.

One key difference from the forward direction described in Scenario 1 is that in order to measure SL SINR considering the SI, the relay UE may want to know SL RSRP from remote UE, which may be measured based on a SL feedback channel from remote UE (e.g. physical sidelink feedback channel (PSFCH)). Another key difference is that if the remote UE is outside of NW coverage, the SL RS transmitting request and/or measurement report may have to be relayed from/to the gNB.

In some cases, the FD relay beam(s) used for the forward direction (Scenario 1) may not be applicable to the reverse direction (Scenario 2) since different Tx and Rx beams may be used for Uu or SL communications (e.g., due to maximum permissible exposure (MPE) requirements/concerns). In this case, FD beam pairs may be separately selected for the reverse relay direction.

Figure 19:
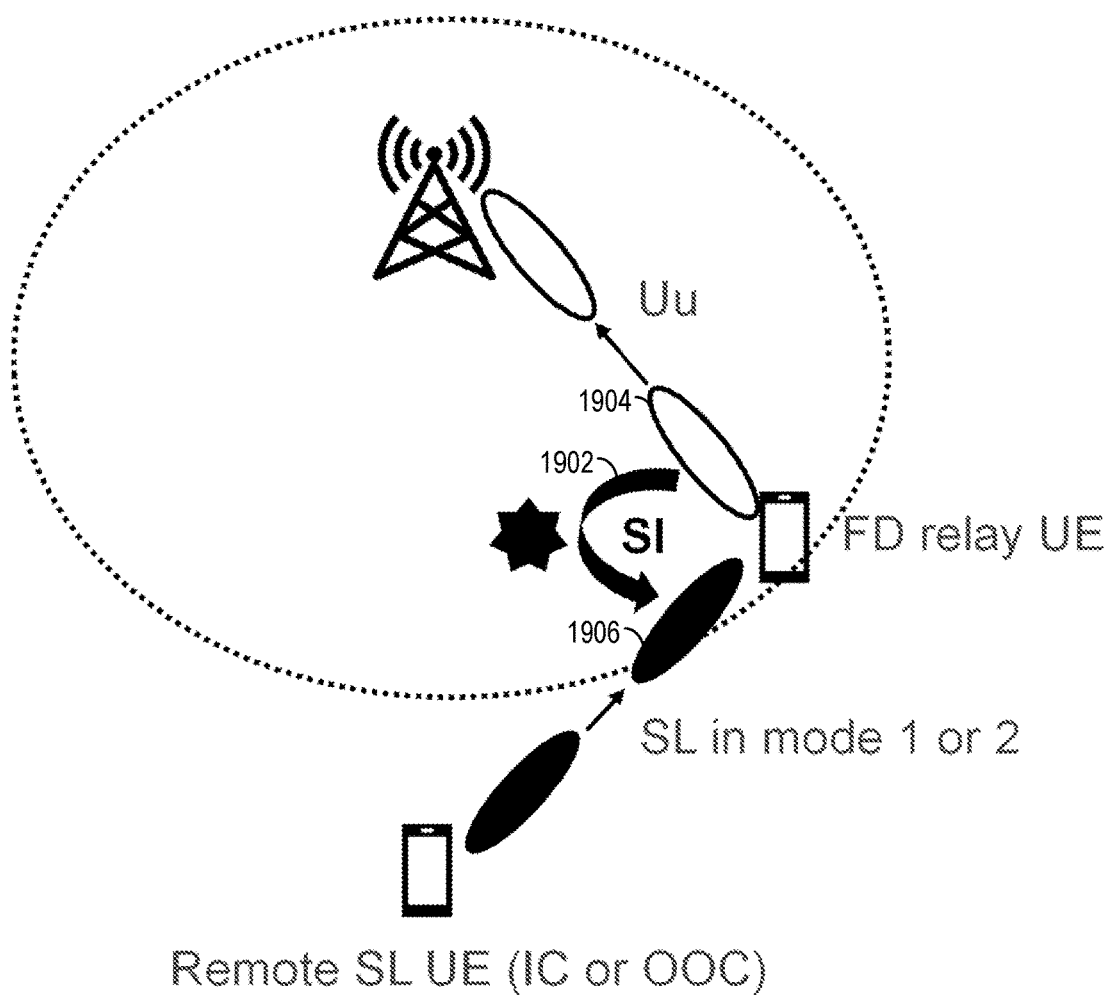
FIG. 19 depicts an example of Scenario 2, in accordance with certain aspects of the present disclosure.
Figure 20:
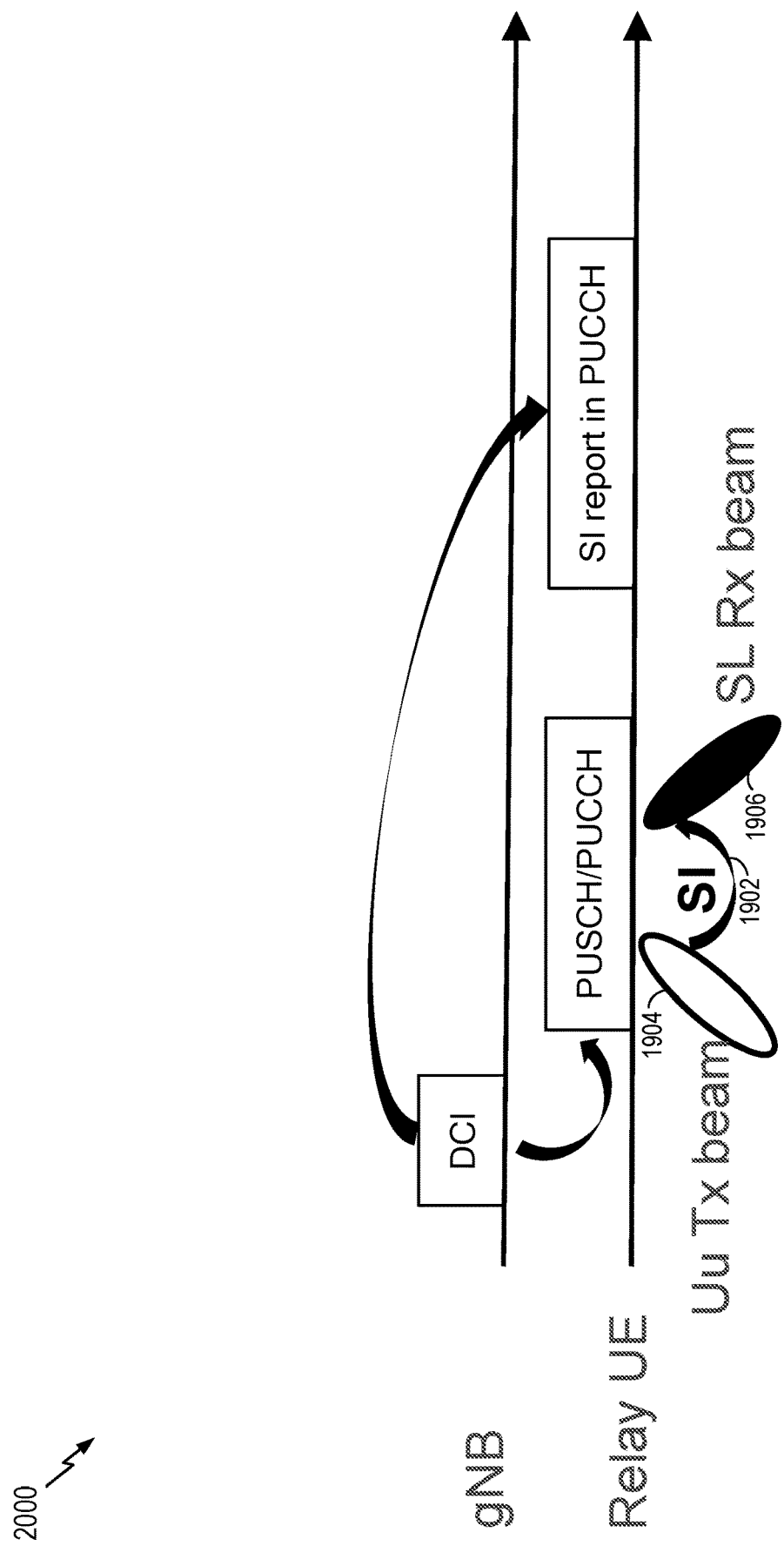
FIG. 20 depicts a timing diagram illustrating an example of Scenario 2, in accordance with certain aspects of the present disclosure.

As illustrated in the example scenario 1900 of FIG. 19, SI 1902 may result from simultaneous uplink transmissions (e.g., using a Uu Tx beam 1904) and sidelink reception (e.g., using a SL Rx beam 1906). According to certain aspects of the present disclosure, FD beam measurement/reporting may be based on Uu/SL traffic. For example, as illustrated in FIG. 20, the gNB may indicate (e.g., via DCI) to the relay UE to transmit UL Tx (e.g., PUSCH/PUCCH) in Uu using a particular Uu Tx beam 1904 and to simultaneously measure the resulting SI 1902 by a particular SL Rx beam 1906 for a given remote SL UE. As illustrated in the timing diagram 2000 of FIG. 20, the measured SI 1902 may be further reported to the gNB (e.g. in an SI report via PUCCH/PUSCH or a Medium Access Control-Control Element (MAC-CE)).

Figure 21:
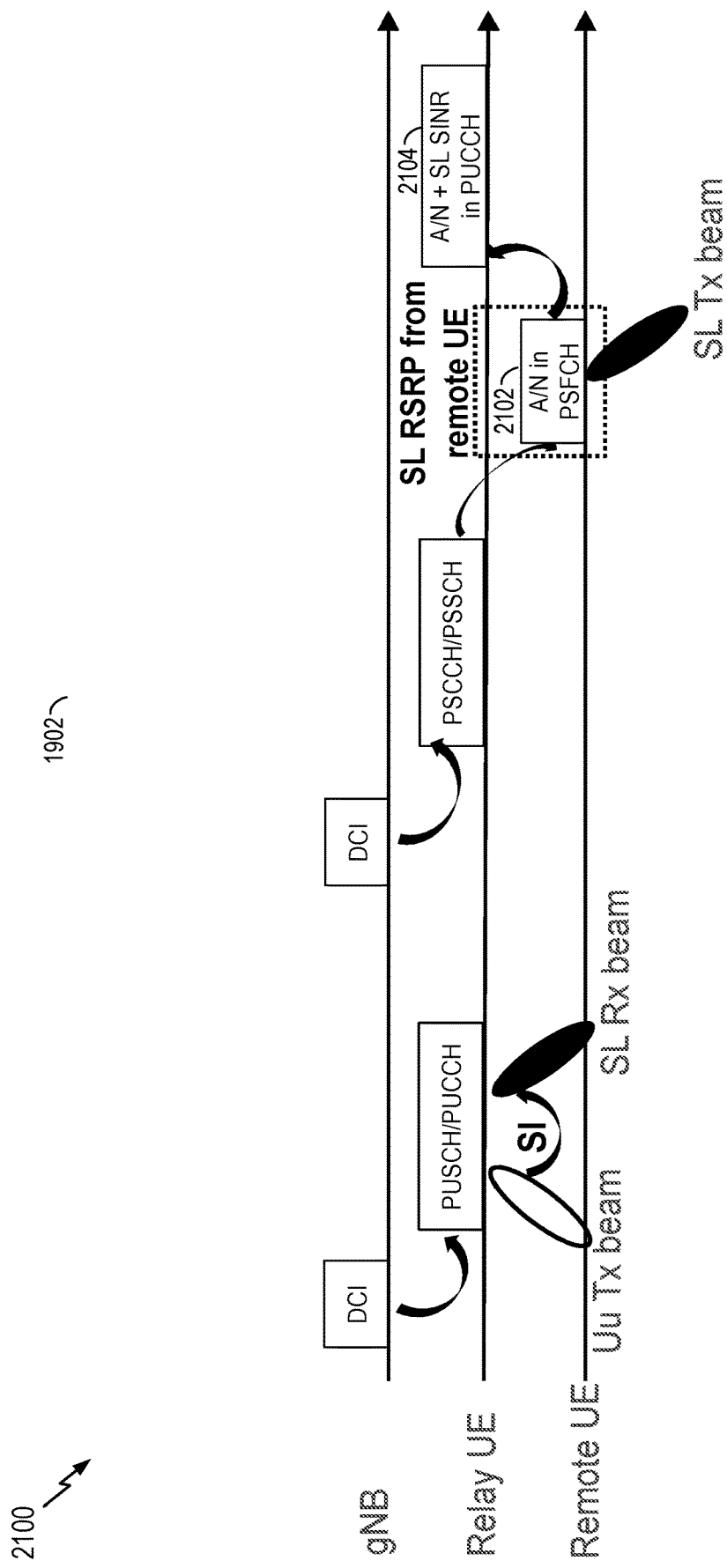
FIG. 21 depicts a timing diagram illustrating an example of Scenario 2, in accordance with certain aspects of the present disclosure.

FIG. 21 depicts a timing diagram 2100 illustrating an example of Scenario 2, in accordance with certain aspects of the present disclosure.

In some aspects, instead of (or in addition to) SI, the gNB may also request the relay UE to measure SL SINR from the remote UE to the relay UE with consideration of SI at the relay UE, based on Uu and SL traffic.

In order to compute the SL SINR, the SI may be measured based on UL traffic in Uu as described above, while the SL RSRP may be measured based on a SL traffic/feedback channel from remote UE to relay UE. For example, the SL RSRP may be measured based on feedback (e.g., ACK/NACK feedback) from the remote UE (e.g., transmitted via PSFCH as illustrated at 2102 in FIG. 21. As shown at 2104, the relay UE may report the SL SINR based on measured SL RSRP and SI (e.g. reported together with ACK/NACK for SL traffic in PUCCH/PUSCH). In some aspects, the relay UE may report SI and SL RSRP separately to the gNB, and the gNB may compute the SL SINR accordingly.

Figure 22:
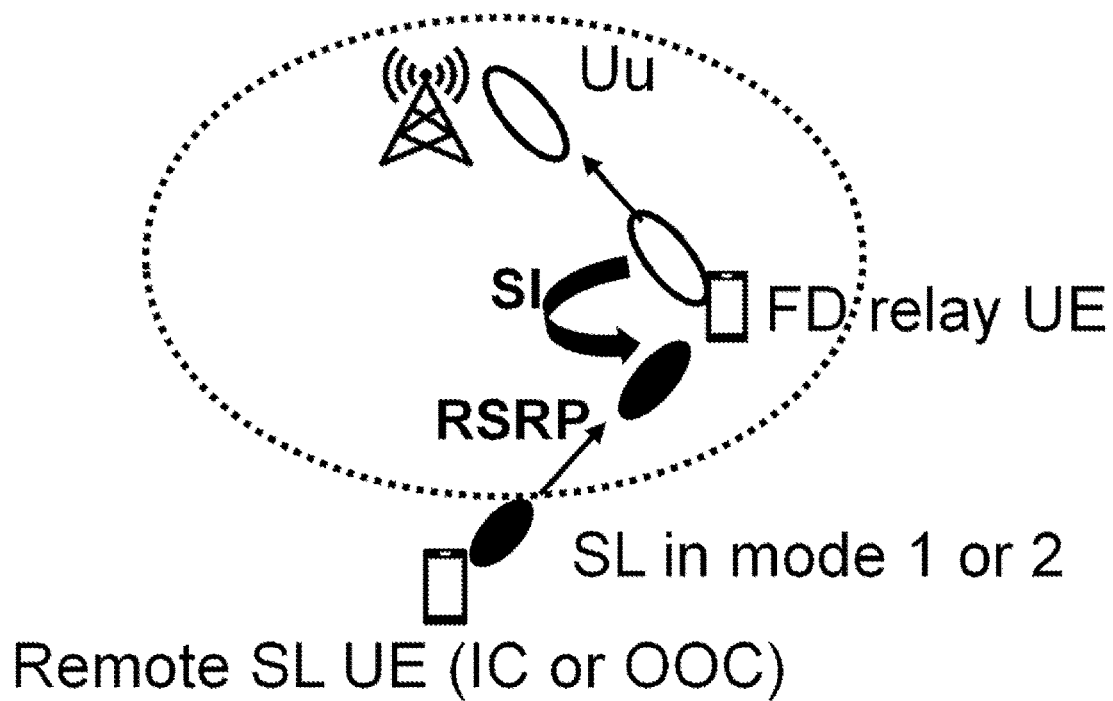
FIG. 22 depicts an example of Scenario 2, in accordance with certain aspects of the present disclosure.
Figure 23:
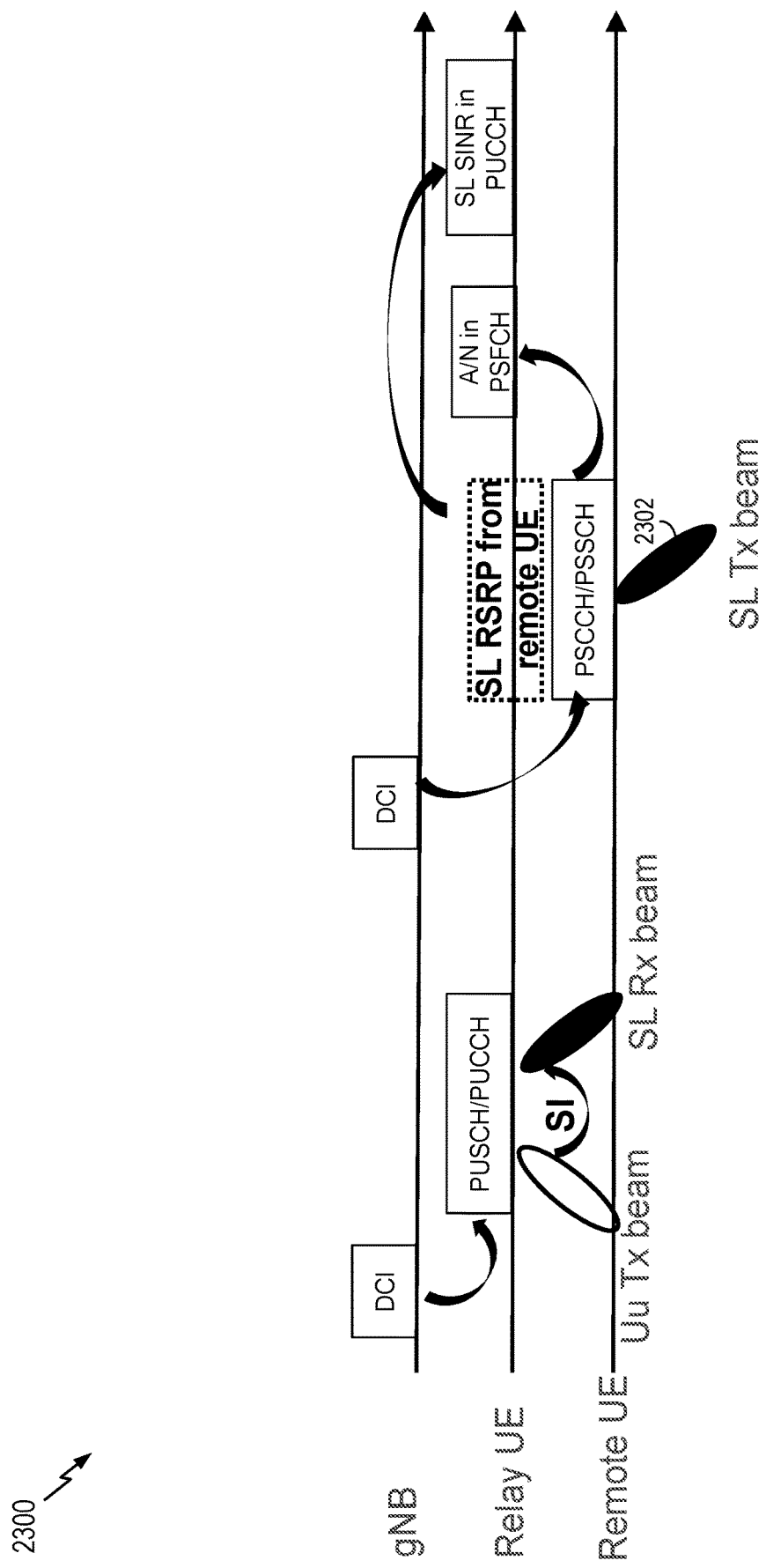
FIGS. 23-26 depict timing diagrams illustrating examples of Scenario 2, in accordance with certain aspects of the present disclosure.

As noted above, and illustrated in example scenario 2200 of FIG. 22, the SL RSRP may be measured based on SL traffic or a feedback channel from a remote UE to the relay UE. In some aspects, this may be done using ongoing traffic from a remote UE (e.g., in half duplex (HD) mode), as illustrated in the timing diagram 2300 of FIG. 23. For example, as illustrated in FIG. 23, an HD SL Tx beam 2302 of the remote UE may be used to measure SL RSRP. The relay UE may recommend the remote UE to use a specific SL Tx beam for its HD transmission matched to the SL Rx beam on which relay UE has measured the SI, so that an accurate SINR may be calculated.

Similarly to the FD beam measurement/reporting for Scenario 1, FD beam measurement/reporting for Scenario 2 may also be based on dedicated RS in SL and Uu. For example, as illustrated in the timing diagram 2400 of FIG. 24, in order to measure SI at the relay UE from a Uu Tx beam to a SL Rx beam at the relay UE, the gNB may schedule the relay UE to transmit an UL RS (e.g. SRS) 2402 with the intended Uu Tx beam 2404, while scheduling an SI measurement resource for the relay UE to measure the SI 2406 with the intended SL Rx beam 2408.

Figure 24:
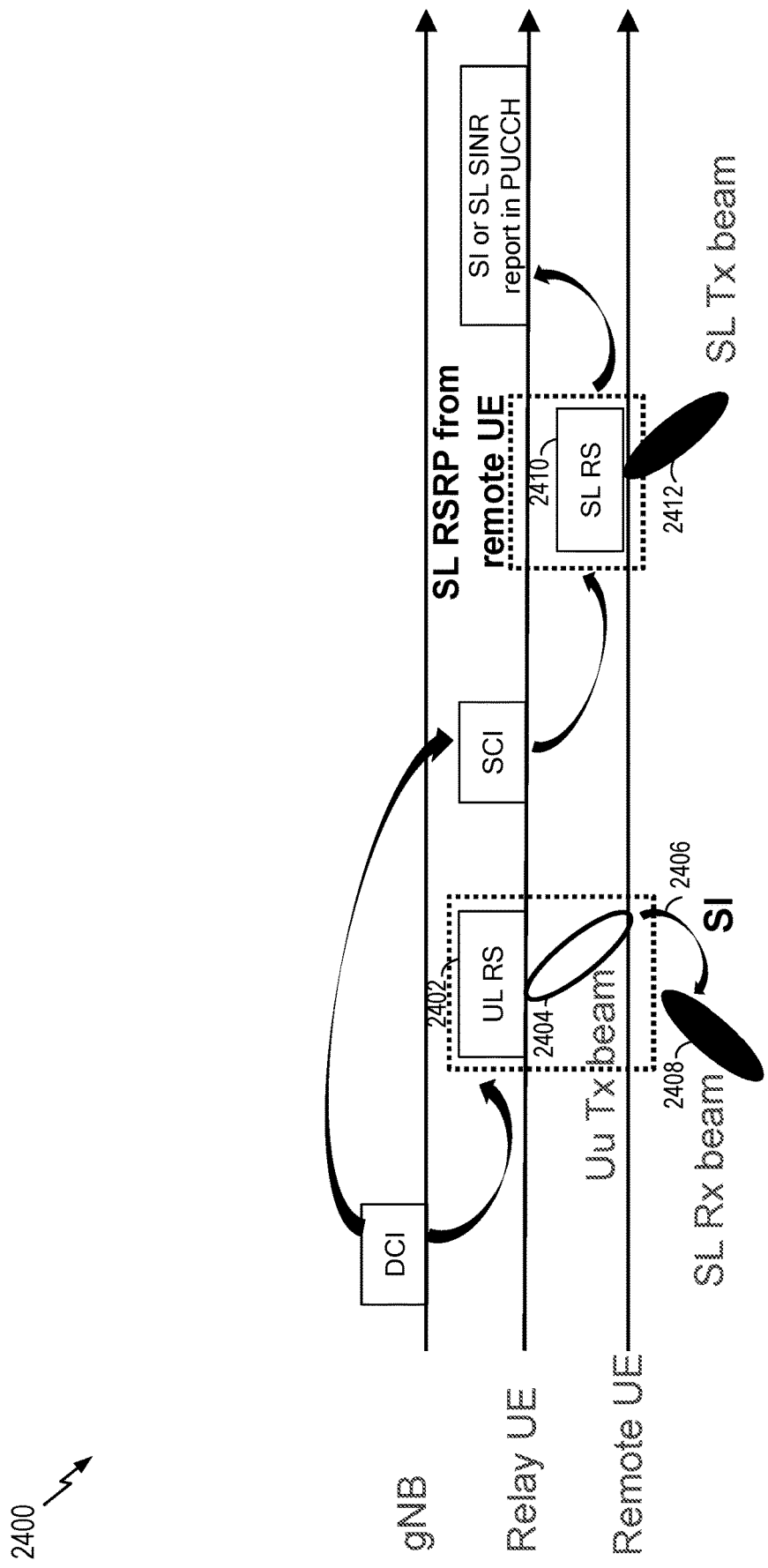

In order to measure SL SINR at the relay, the relay UE may want to know the SL RSRP from the remote UE when the intended SL Tx/Rx beams are used. To achieve this, the gNB may schedule the remote UE to transmit SL RS 2410 (e.g. SL channel state information (CSI)-RS) with the intended SL Tx beam 2412 to the relay UE, and also schedule the relay UE to measure RSRP with the intended SL Rx beam, as illustrated in FIG. 24. If the remote UE is OOC of the network, the gNB's request for transmitting the SL RS may be relayed by the relay UE (e.g. via SCI).

As noted above, in some cases, time-frequency resources may be allocated for SINR reporting. In such cases, when remote UE is in mode 2 SL, sidelink transmission timing may not be controlled by the gNB. Hence, some gNB flexibility regarding the SINR reporting resources may be necessary, since SL transmission timing may not be known beforehand at the gNB (e.g., affecting RSRP calculation). Options for increasing gNB flexibility (e.g., flexibility of timing requirements for reporting) may be understood with reference to the timing diagrams 2500 and 2600 illustrated in FIGS. 25-26 respectively.

In some aspects (e.g., according to a first option: Alt 1), the gNB may indicate a longer default time between the SI measurement resource and the SINR reporting resource in mode 2 compared to mode 1, in order to increase the probability of capturing an SL transmission at the relay UE. If no SL transmission is captured, the relay UE may not report anything, and the gNB may schedule SINR measurement again.

In some aspects (e.g., according to a third option: Alt 3), the gNB may allocate a fixed SINR reporting time-frequency resource with flexible contents. If an SL transmission is captured and SL RSRP is calculated before the allocated time, the relay UE may indicate the SINR in the report.

In some cases, when Alt 1 or Alt 3 is used and if no SL transmission is captured, relay UE may indicate only the SI in the report. In such cases, one bit may be configured to indicate whether the report contains SINR or SI value.

Figure 25:
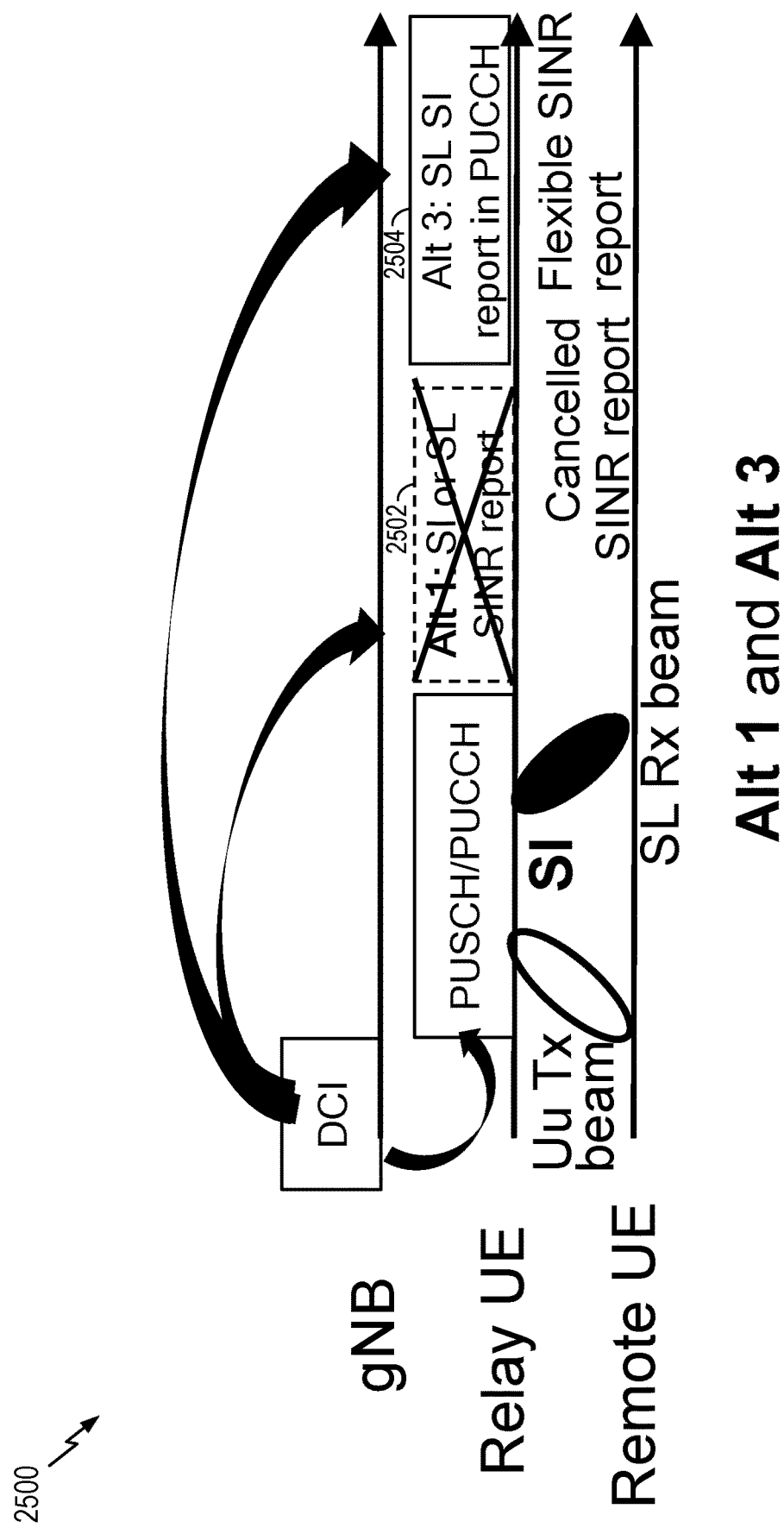

Alt 1 and Alt 3 may be understood with reference to the timing diagram 2500 of FIG. 25. For example, as illustrated, an SI or SL SINR report may be canceled (as indicated at 2502) if no SL transmission is captured (e.g., within the longer default time window or the fixed SINR reporting resource). In such cases, the gNB may schedule the SINR measurement again, or, as illustrated, the relay UE may transmit an SL SI report 2504 (e.g., containing the SI without the SINR) instead.

Figure 26:
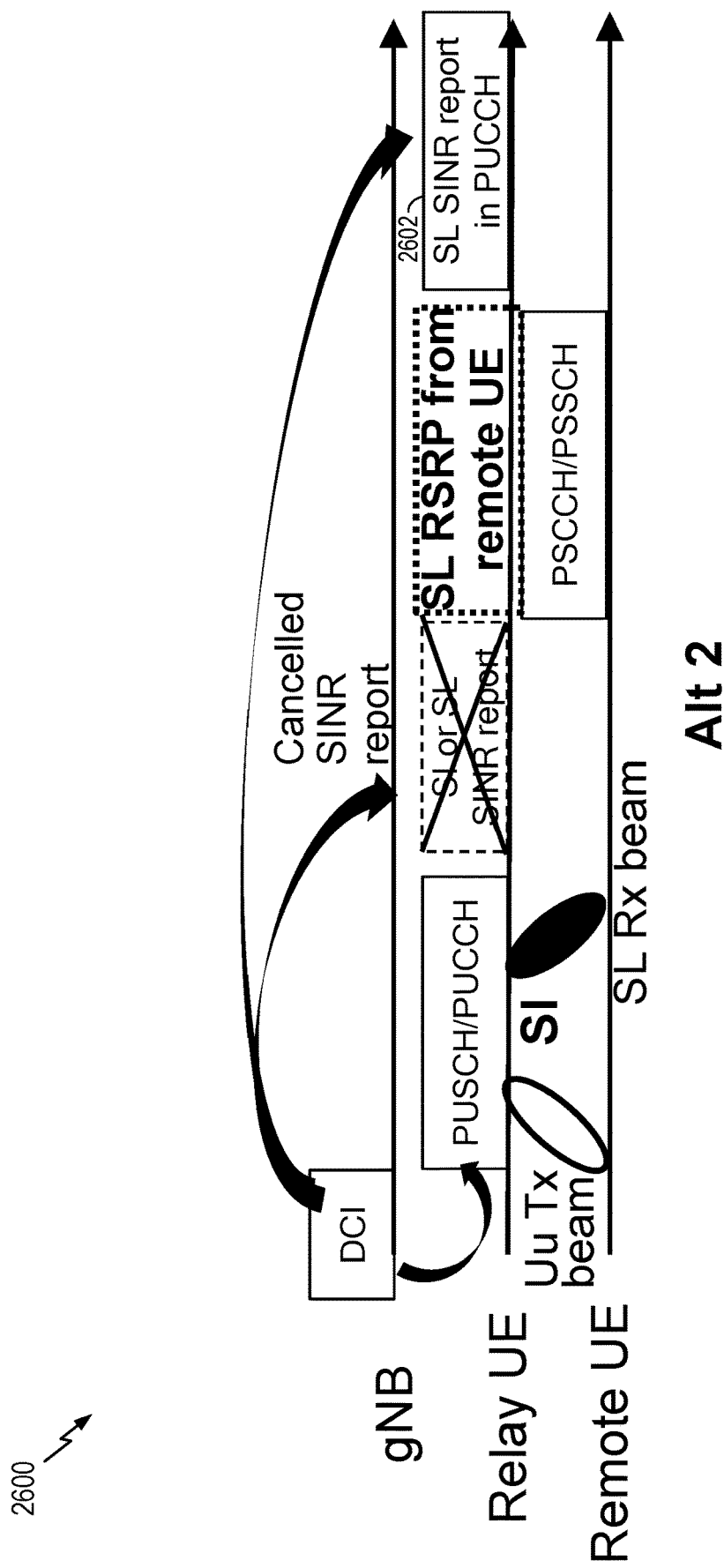

In some aspects (e.g., according to a second option: Alt 2), the gNB may schedule periodic/semi-persistent resources for SINR reporting for mode 2. Alt 2 may be understood with reference to the timing diagram 2600 of FIG. 26. For example, the relay UE may use the resource later in time than an SL mode 2 reception in order to send the SINR report 2602 (e.g., in PUCCH), as illustrated in FIG. 26. If no SL reception occurs in a certain (e.g., configured) number of resources, the grant may be automatically canceled, or the gNB may cancel the grant.

Figure 27:
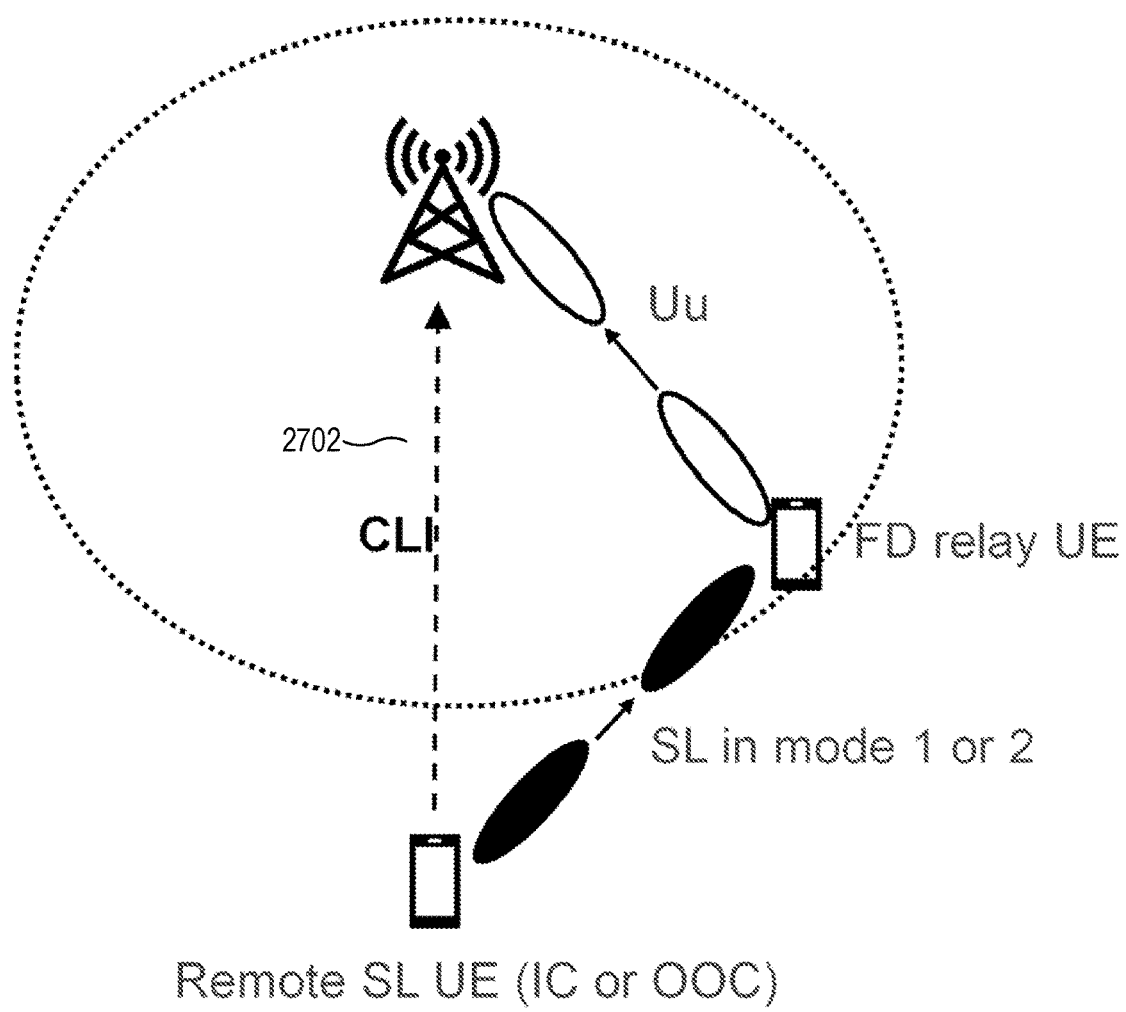
FIG. 27 depicts an example of Scenario 2, in accordance with certain aspects of the present disclosure.

As noted above, the remote UE may cause non-negligible CLI to gNB UL communications, using selected Uu and SL FD relay beams (e.g., in the reverse direction). This non-negligible CLI may be understood with reference to the example scenario 2700 illustrated in FIG. 27.

Figure 28:
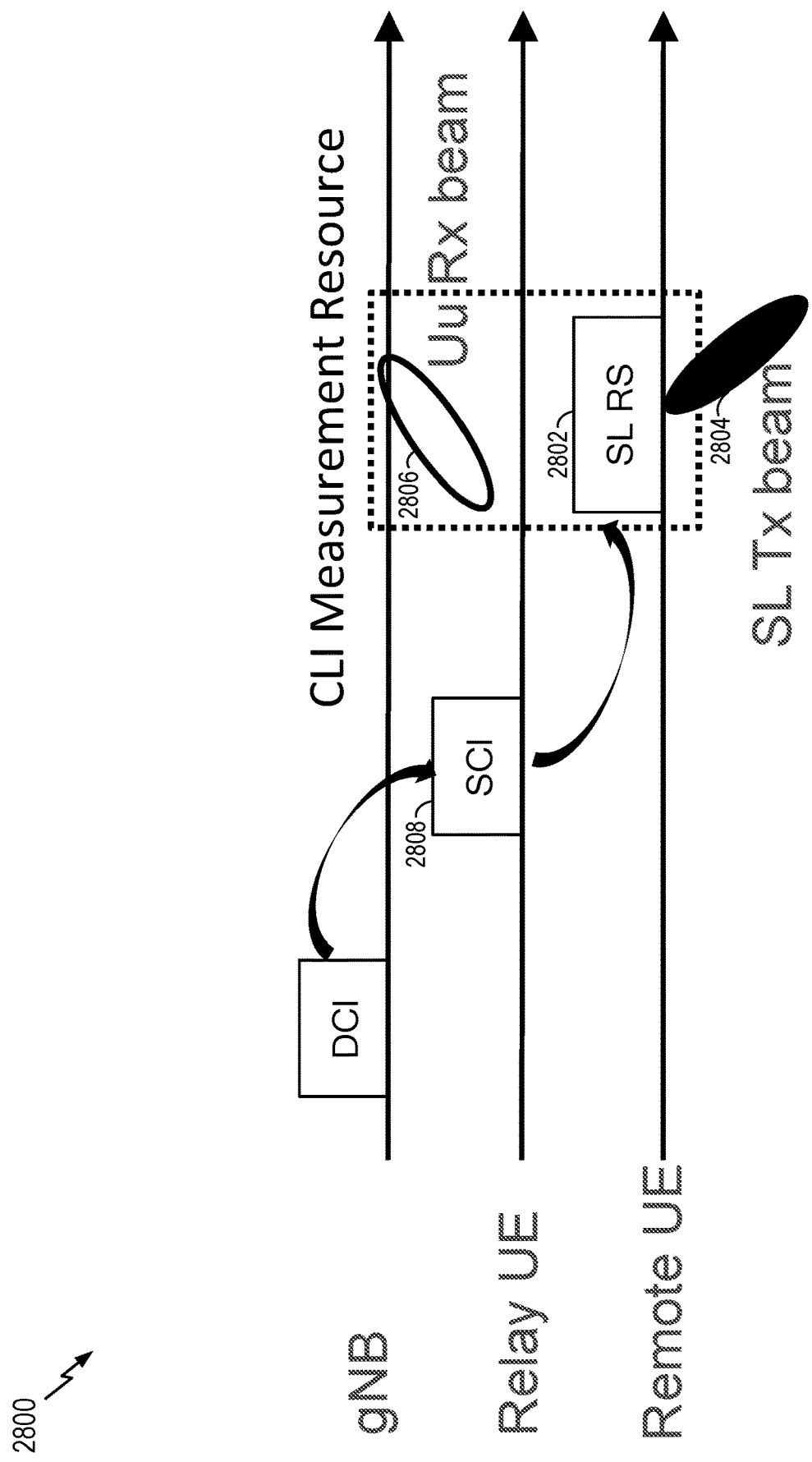
FIG. 28 depicts a timing diagram illustrating an example of Scenario 2, in accordance with certain aspects of the present disclosure.

According to certain aspects of the present disclosure, the gNB may request that the remote UE to participate in CLI measurement to determine if the remote UE will cause non-negligible CLI 2702 to gNB UL communications, based on the selected Uu and SL FD relay beams in the reverse direction. For example, in some aspects, CLI estimation may be based on UL measurement. In such aspects, as illustrated in the timing diagram 2800 of FIG. 28, the gNB may request the remote UE to transmit SL RS 2802 with the intended SL Tx beam 2804, based on which the gNB may measure CLI with the intended Uu Rx beam 2806. In some cases, if the remote UE is OOC of the network, the gNB's request for transmitting the SL RS may have to be relayed (e.g. via SCI), as illustrated at 2808 in FIG. 28.

Figure 29:
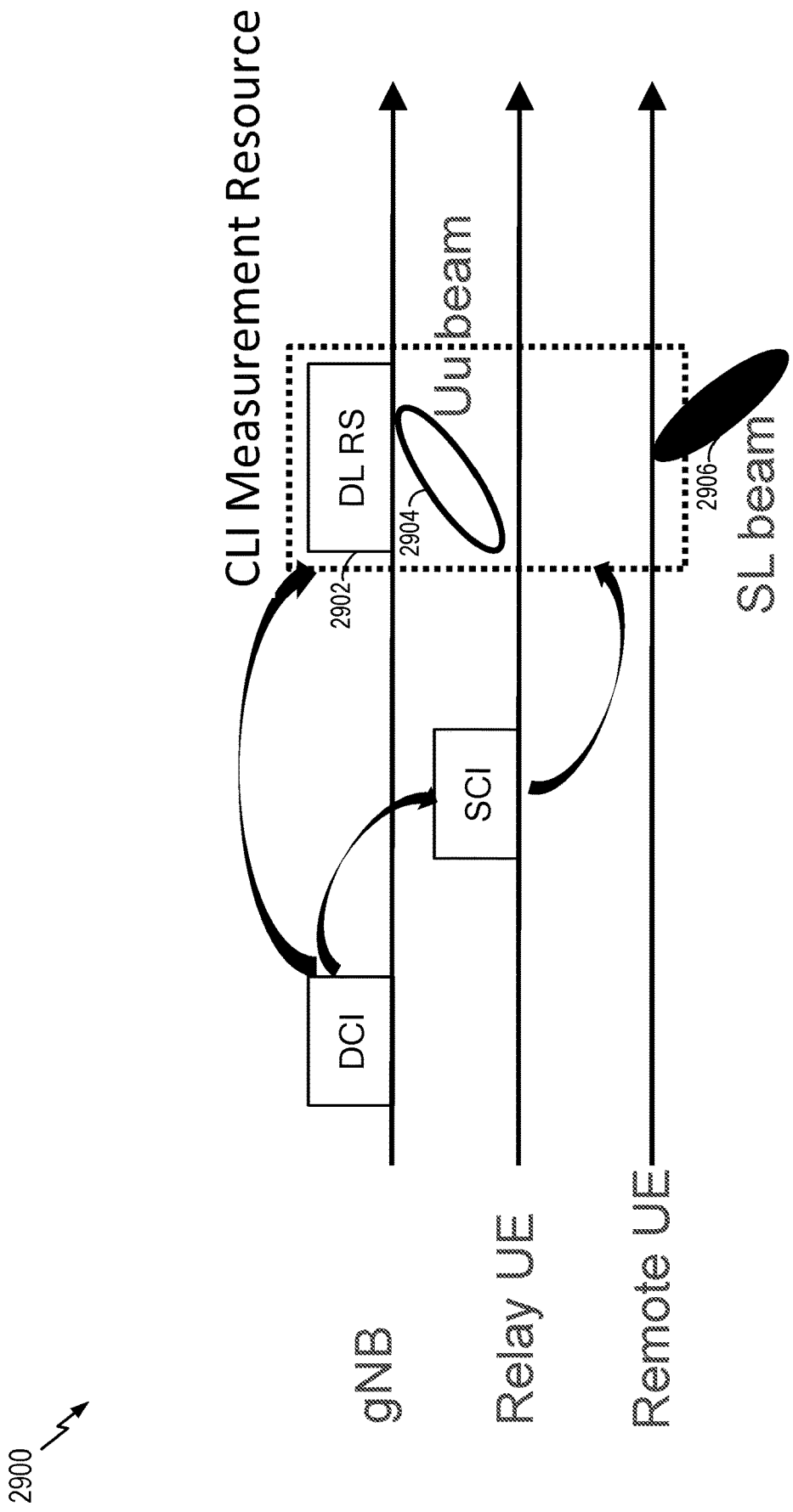
FIG. 29 depicts a timing diagram illustrating an example of Scenario 2, in accordance with certain aspects of the present disclosure.

In some aspects, CLI estimation may be based on DL measurement. In such aspects, as illustrated in the timing diagram 2900 of FIG. 29, the gNB may transmit DL RS 2902 with a Uu DL beam 2904 (e.g., which may be an example of Uu Rx beam 2806) to the FD relay UE (e.g., which may use the corresponding Uu UL beam), and the gNB may request the remote UE to report the RSRP/RSSI of the DL RS with an SL Rx beam 2906 (e.g., which may be an example of SL Tx beam 2804) corresponding to the SL Tx beam used by the FD relay UE. Based on this DL report, the gNB may estimate the path loss and CLI (e.g., if the gNB knows remote UE Tx power). In some cases the CLI may be reported by the remote UE, instead of the gNB estimating CLI. In some cases, if the remote UE is OOC of the network, the gNB's request for measuring the DL RS and the DL report may have to be relayed (e.g. via SCI and PSFCH respectively) as illustrated in FIG. 29. In such cases, time-frequency resources for the relayed CLI report may be gNB configured.

Aspects of the present disclosure, including centralized beam determination for FD communications, may be applied to scenarios involving bi-directional FD between two SL UEs (e.g., with at least 1 SL UE in network coverage). According to certain aspects, for example, the gNB may determine and signal the SL Tx and Rx beams at each of the two UEs participating the inter-UE bi-directional FD communication.

Figure 30:
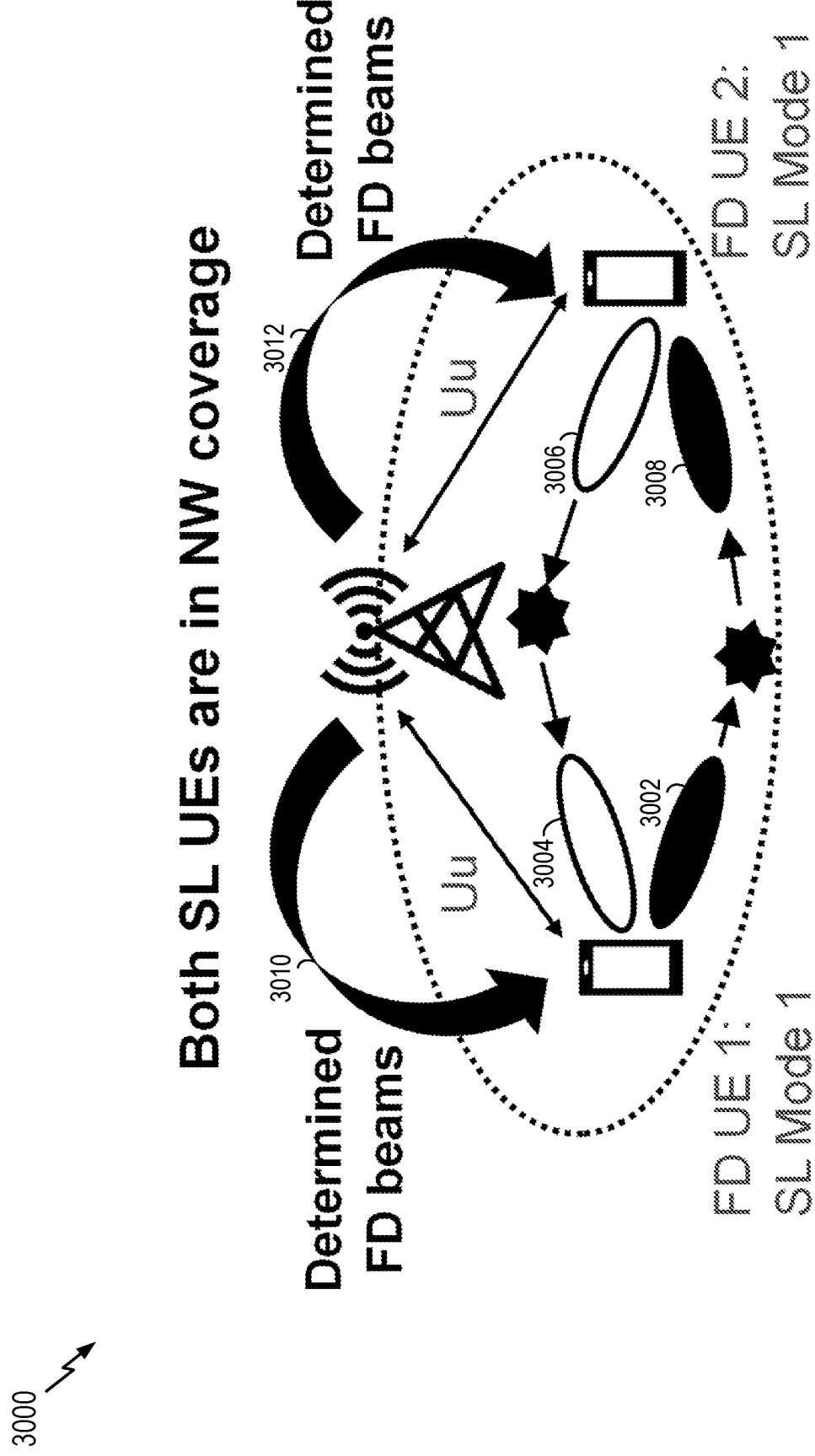
FIG. 30 depicts an example of bi-directional full duplex (FD) communications where both sidelink (SL) UEs are in coverage (IC) of the network, in accordance with certain aspects of the present disclosure.

FIG. 30 depicts an example scenario 3000 involving bi-directional FD communications where both SL UEs are in coverage (IC) of the network. In such a scenario, each SL UE may operate in Mode 1 (e.g., its SL resource is scheduled by the gNB). According to certain aspects of the present disclosure, to enable bi-directional SL FD between 2 SL UEs, the gNB should determine SL Tx and Rx beams for each SL UE to minimize the self-interference (SI) at each SL UE.

As shown in FIG. 30, in this scenario, each SL UE has a transmit beam and a receive beam. For example, FD UE 1 has a transmit beam 3002 and a receive beam 3004, and FD UE 2 has a transmit beam 3006 and a receive beam 3008. Each SL UE's transmit beam forms a beam pair with the other SL UE's receive beam. For example, as illustrated, transmit beam 3002 forms a beam pair with receive beam 3008, and transmit beam 3006 forms a beam pair with receive beam 3004. Additionally, as illustrated, each SL UE forms a Uu link with the network entity.

According to certain aspects of the present disclosure, a gNB may initiate/coordinate SL beam measurement/reporting for each SL UE. The gNB may then determine and signal SL Tx and Rx beams for each SL UE (e.g., for bi-directional SL FD) based on the measurement/reporting, as illustrated at 3010 and 3012 in FIG. 30.

Figure 31:
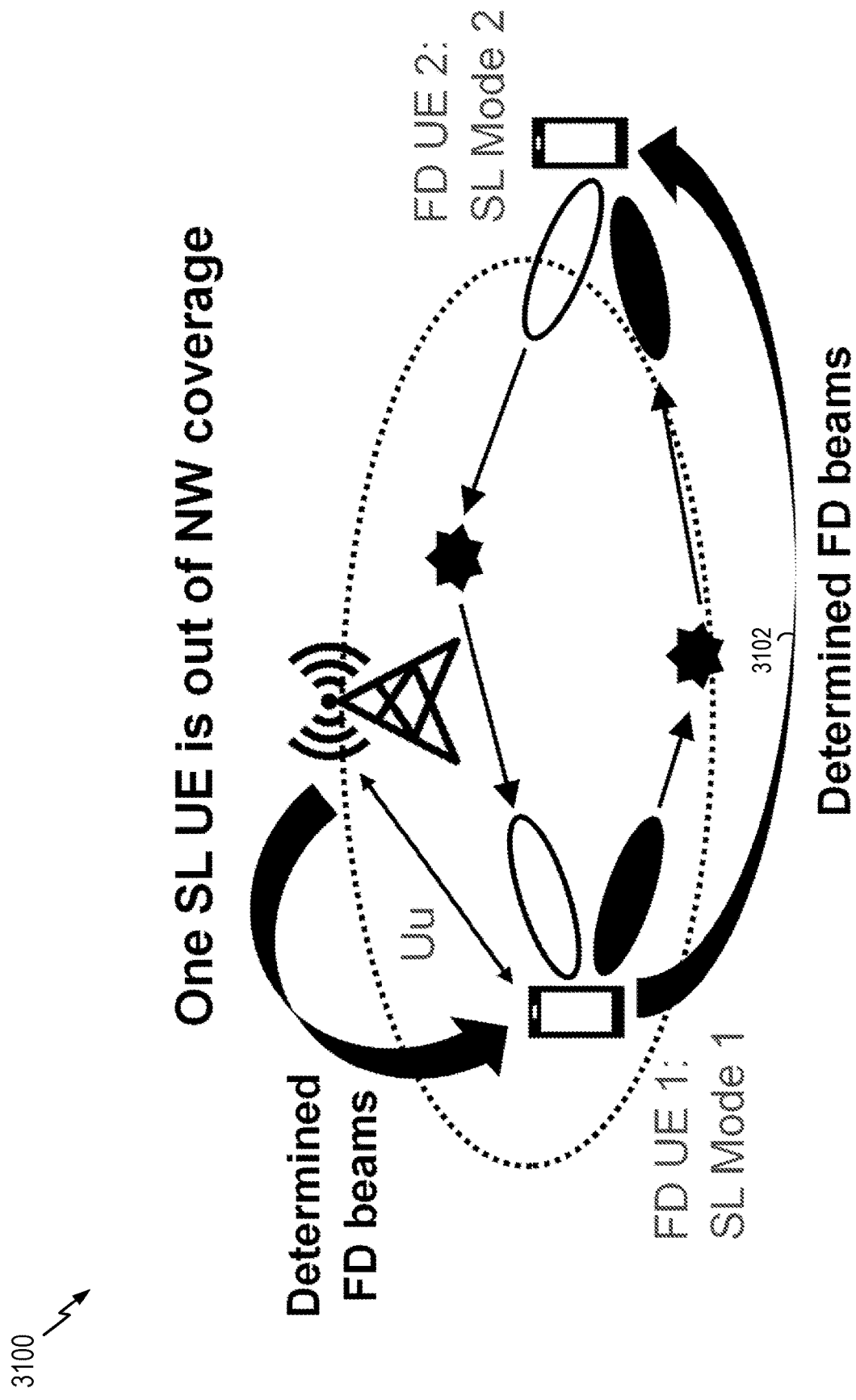
FIG. 31 depicts an example of bi-directional FD communications where at least one SL UE is out of coverage (OOC) of the network, in accordance with certain aspects of the present disclosure.

In some cases, however, one SL UE may be IC of the network, while the other SL UE is outside of coverage (OOC) of the network. As illustrated in example scenario 3100 of FIG. 31, in such cases, the SL UE (e.g., FD UE 2) that is OOC of the network may not form a Uu link with the network entity. Further, in such cases, the IC SL UE is in Mode 1, while the OOC SL UE is in Mode 2 (e.g., its SL resource is selected by itself based on its own sensing). When one SL UE is OOC, the measurement/report/beam indication may be relayed via the SL UE that is IC, as illustrated at 3102 in FIG. 31.

Figure 32:
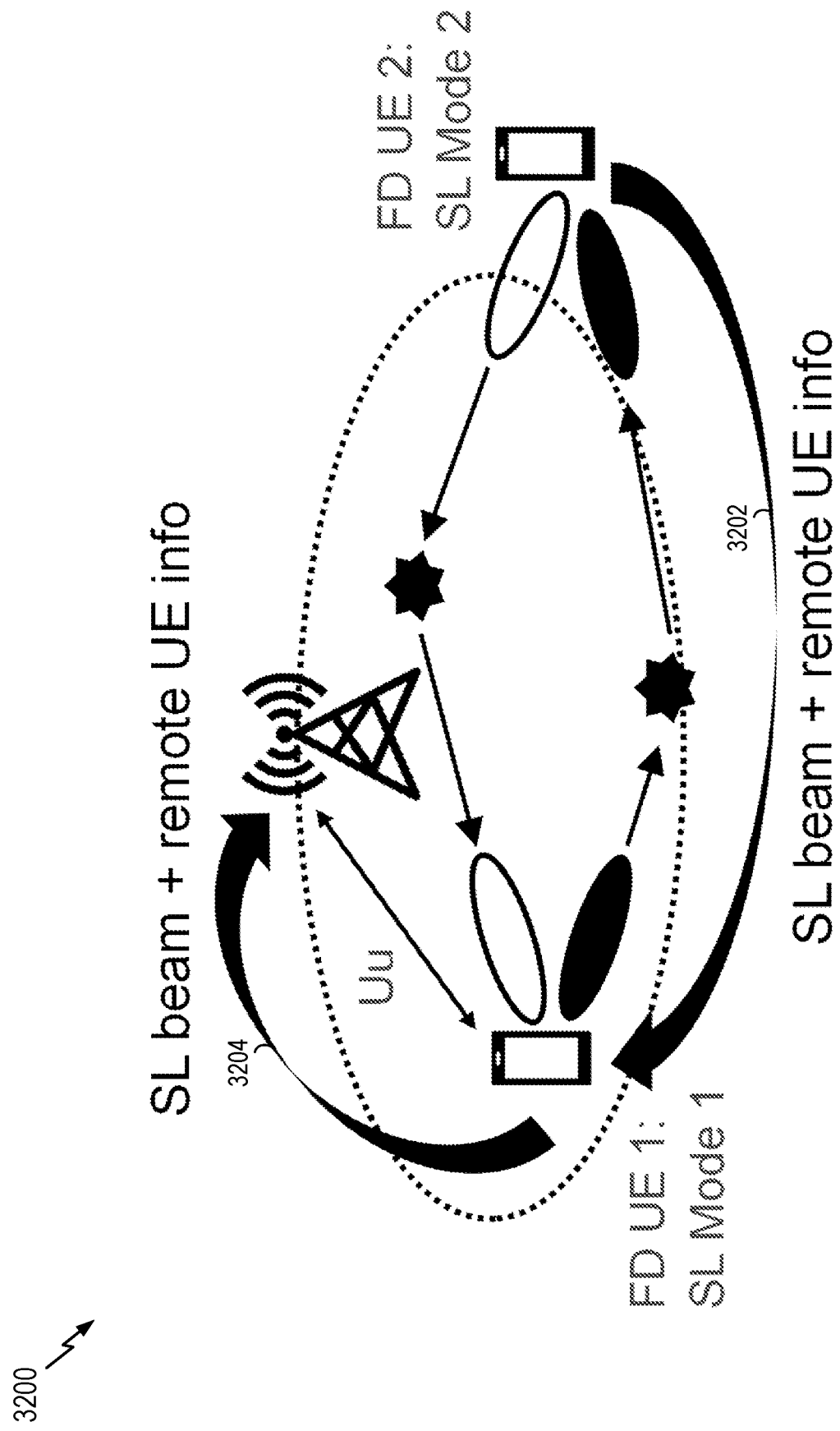
FIGS. 32-33 depict examples of bi-directional FD communications, in accordance with certain aspects of the present disclosure.

Similarly to Scenario 1 and Scenario 2 discussed above, in order to facilitate gNB scheduling of FD beam measurement at a SL UE, an SL UE may provide the gNB with candidate SL Tx and/or Rx beam IDs and associated communicating neighbor UE ID (e.g. top X best SL Tx and/or Rx beams in half-duplex (HD) mode), as illustrated in example scenario 3200 of FIG. 32. For example, since FD UE 2 is OOC, it may provide SL beam and remote UE information to FD UE 1 (e.g., which is IC), as illustrated at 3202. As shown at 3204, FD UE 1 may relay the SL beam and remote UE information to the network entity/gNB.

In some aspects, SL Tx and/or Rx beam ID may be represented (e.g., signaled) by SL Tx and/or Rx TCI state ID. In some aspects, associated neighbor UE ID may be represented by Layer 1/2 (L1/L2) SL UE ID. In some aspects, the report may be periodically (P)/semi-persistently (SP)/or aperiodically (AP) scheduled, or event triggered (e.g. whenever top X best SL Tx and/or Rx beams change). In some cases, as noted above, when one of the SL UEs is OOC, the information that it provides may be relayed via an IC SL UE, as illustrated in FIG. 32.

Figure 33:
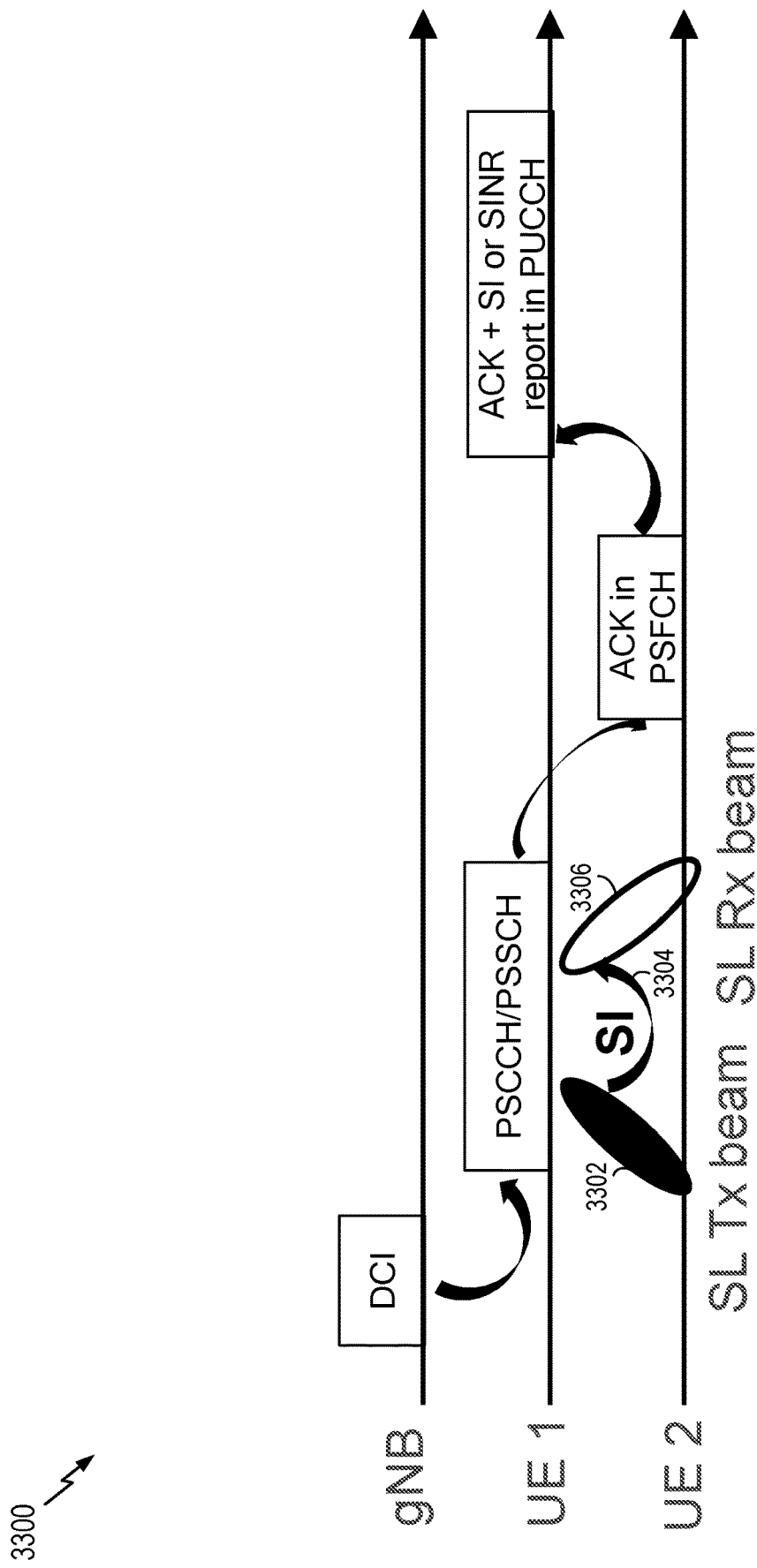

As noted above, according to certain aspects of the present disclosure, the gNB may configure measurement/reporting for FD SL beam pair selection (e.g., in a bi-directional FD scenario). In order to select FD SL beams between two UEs, the gNB may request each UE to report SI or DL SINR for a candidate pair of SL Tx and Rx beams at each UE. For example, in some aspects, the FD beam measurement/reporting may be based on SL traffic. For example, as illustrated in the timing diagram 3300 of FIG. 33, the gNB may indicate a UE (e.g. UE 1 which is IC) to transmit SL traffic (e.g., PSCCH/PSSCH) with a particular SL Tx beam 3302 for a given neighbor SL UE (e.g. UE 2), and simultaneously measure the SI 3304 caused at a particular SL Rx beam 3306.

In some aspects, SL Tx and Rx beams for a given neighbor UE may be indicated by corresponding SL TCI states.

Figure 34:
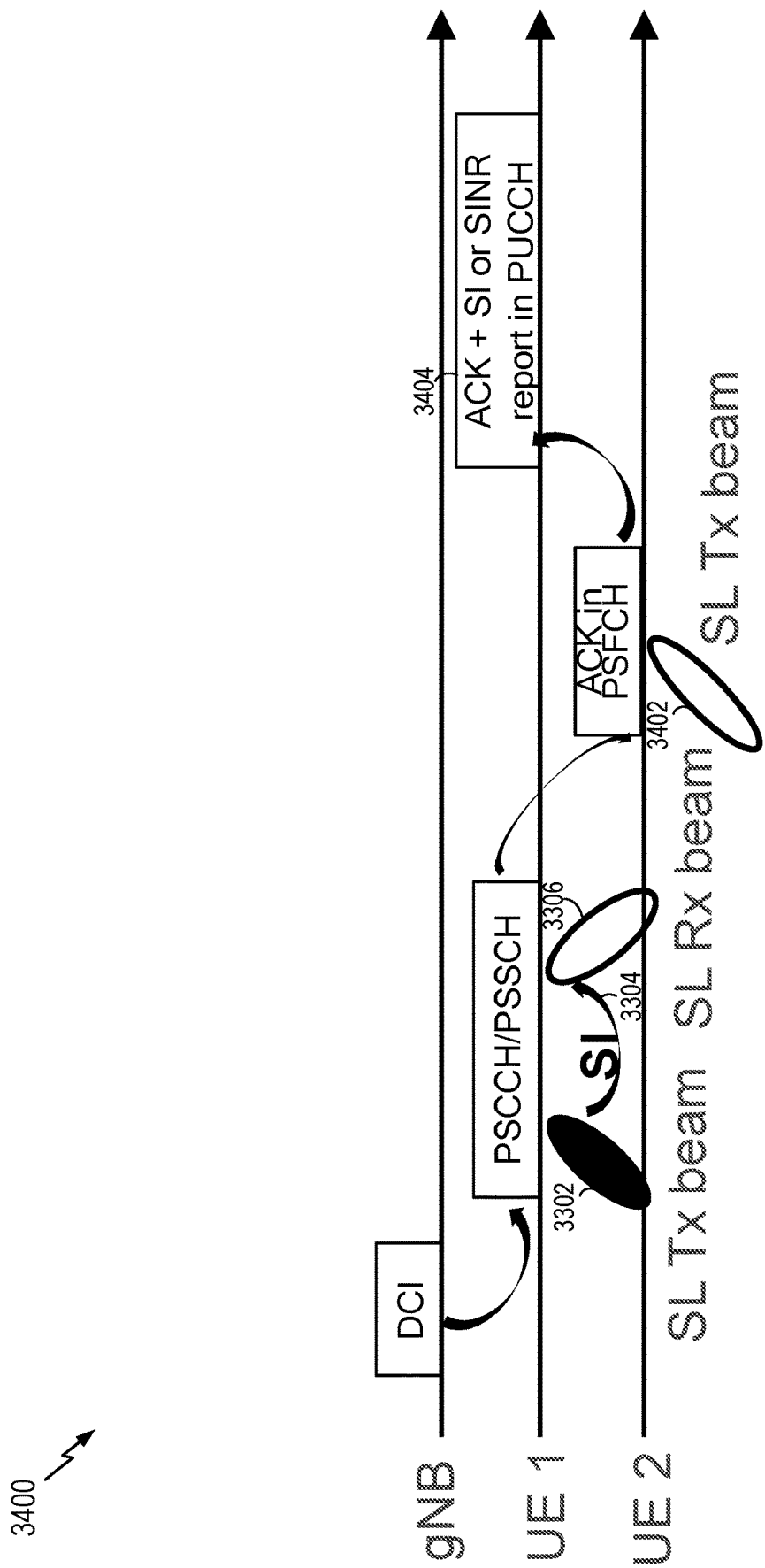
FIGS. 34-35 depict timing diagrams illustrating examples of bi-directional FD communications, in accordance with certain aspects of the present disclosure.

In some aspects, instead of (or in addition to) SI, the gNB may also request a SL UE to measure the SL SINR of a SL Rx beam considering SI from a SL Tx beam, as illustrated in the timing diagram 3400 of FIG. 34. In this way, the SL RSRP can be measured from traffic/feedback that uses same SL Rx beam without additional overhead. For example, the gNB may indicate a neighbor UE (e.g. UE 2) to transmit PSFCH with the intended SL Tx beam 3402 corresponding to the SL Rx beam at the measuring UE (e.g. UE 1). In some cases, SL RSRP may be measured based on a PSCCH/PSSCH transmission configured (e.g., by the gNB or by one or both SL UEs) to use the same SL Tx-Rx beams.

In some aspects, a SL UE may report the SI or SL SINR to the gNB in a separate report or together with ACK/NACK for the SL traffic, as illustrated at 3404. In some aspects, SL-traffic based FD relay beam measurement/reporting can be dynamically, semi-persistently, or periodically scheduled.

In some aspects, the gNB may also indicate the time/frequency location of SL measurement resource(s) for the SI measurement (e.g. a whole SL BWP/resource pool or SL sub-band(s)).

According to certain aspects of the present disclosure, the FD beam measurement/reporting may be based on dedicated RS in SL. In some aspects, for example, the transmitted and received SL traffic at the measuring UE (e.g. PSCCH/PSSCH and PSFCH) may be replaced by transmitted and received SL RSs 3502 and 3504 (e.g. CSI-RS), as illustrated in the timing diagram 3500 of FIG. 35.

Figure 35:
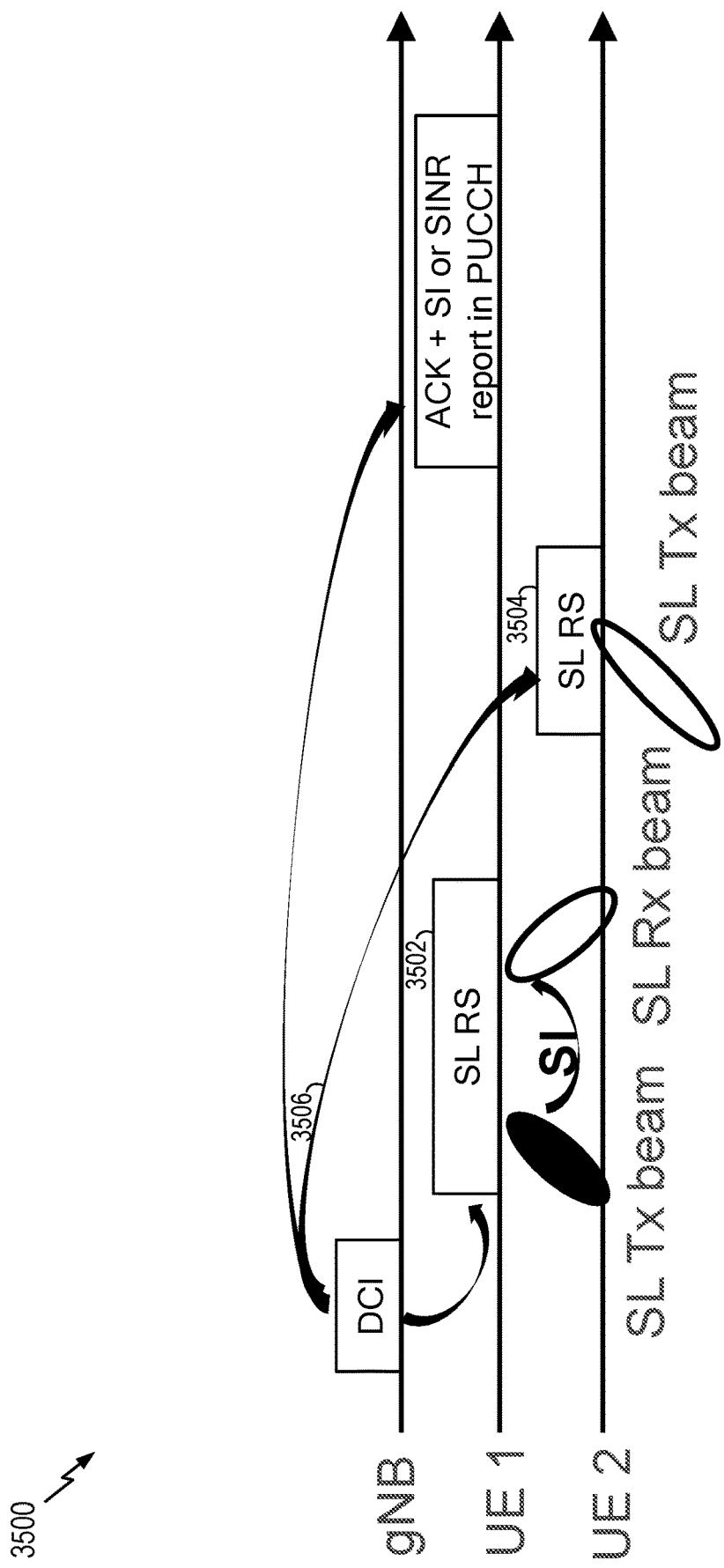

In some cases, when a neighbor UE (e.g., UE 2) is also IC, its transmitted SL RS may be directly scheduled by the gNB, as illustrated at 3506 in FIG. 35. Otherwise, the SL RS transmission request may be relayed via an IC SL UE (e.g., UE 1).

Figure 36:
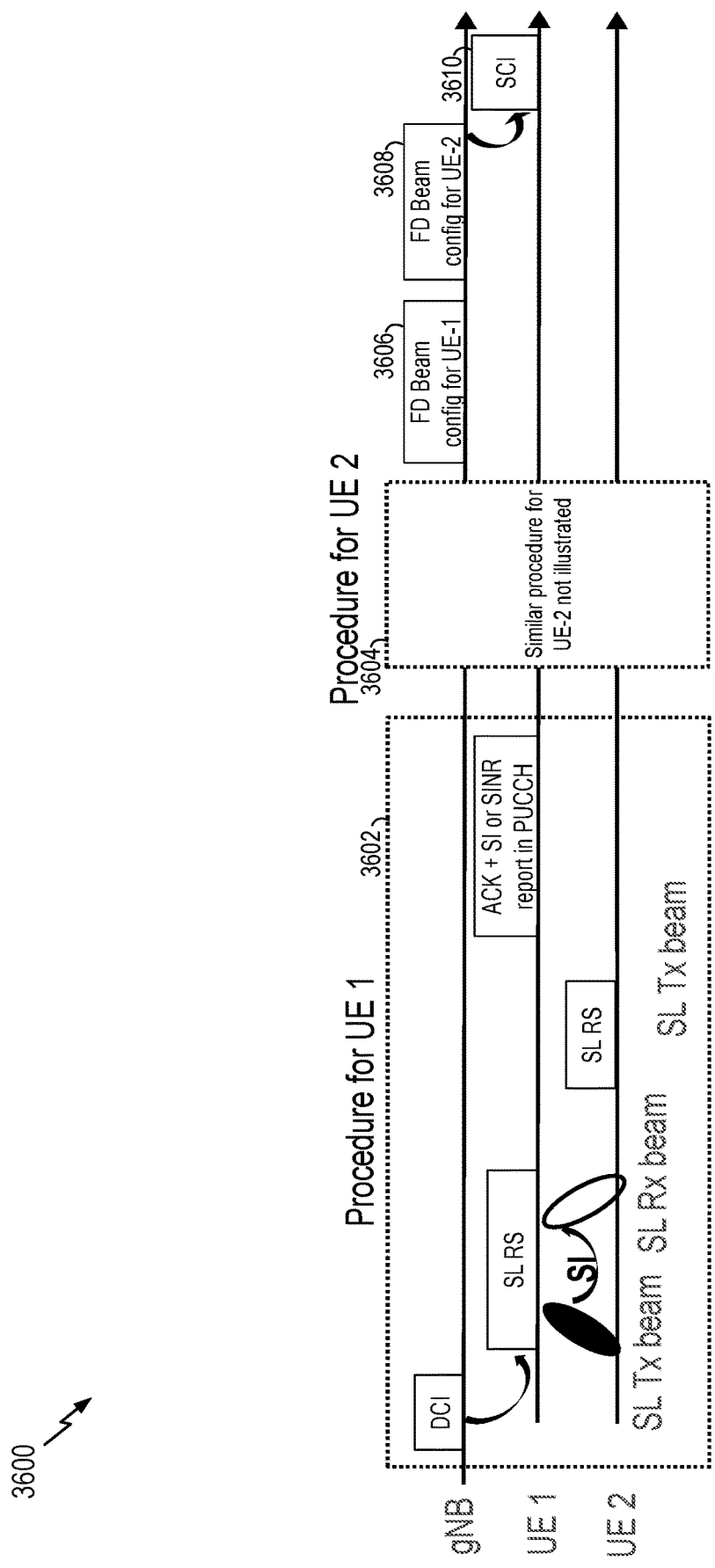
FIG. 36 depicts a timing diagram illustrating FD beam configuration, in accordance with certain aspects of the present disclosure.

According to certain aspects of the present disclosure, after determining FD beams (e.g., Tx and Rx FD beams for a relay UE or for bi-directional FD UEs), the gNB may indicate the chosen FD beams to the respective UEs (e.g., configure the UEs with the chosen FD beams), as illustrated in the timing diagram 3600 of FIG. 36. For IC UEs, the indication may be direct (e.g., via Uu DL). For OOC UEs, the indication may be relayed via an IC UE.

For example, as illustrated in FIG. 36, in a bi-directional FD UE scenario, a procedure 3602 (e.g., as described in detail above) may be performed for UE 1 in order to determine its FD Tx and Rx beams. A similar procedure 3604 may be performed to determine FD Tx and Rx beams for UE 2. Once the FD beams are determined for both UEs, the gNB may configure UE1 with its respective determined FD beams at 3606 and UE2 with its respective determined FD beams at 3608. As noted above, if UE2 is OOC, UE1 (e.g., which may be IC) may relay UE2's FD beam configuration (e.g., via SCI), as illustrated at 3610.

Example Operations

Figure 37:
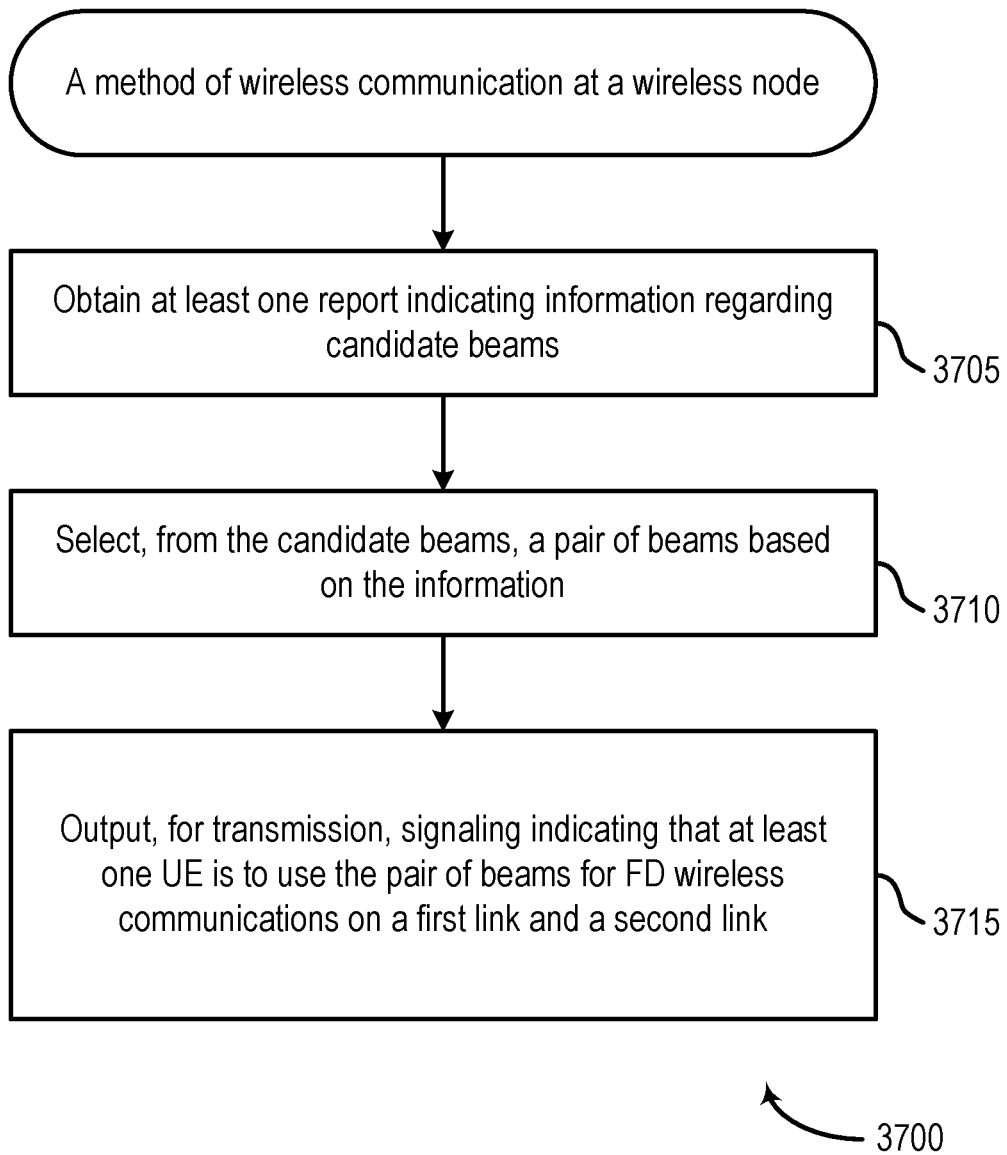
FIG. 37 depicts a method for wireless communications.

FIG. 37 shows an example of a method 3700 of wireless communication at a wireless node, such as a BS 102 of FIGS. 1 and 3, or a disaggregated base station as discussed with respect to FIG. 2.

Method 3700 begins at step 3705 with obtaining at least one report indicating information regarding candidate beams. In some cases, the operations of this step refer to, or may be performed by, circuitry for obtaining and/or code for obtaining as described with reference to FIG. 39.

Method 3700 then proceeds to step 3710 with selecting, from the candidate beams, a pair of beams based on the information. In some cases, the operations of this step refer to, or may be performed by, circuitry for selecting and/or code for selecting as described with reference to FIG. 39.

Method 3700 then proceeds to step 3715 with outputting, for transmission, signaling indicating that at least one UE is to use the pair of beams for FD wireless communications on a first link and a second link. In some cases, the operations of this step refer to, or may be performed by, circuitry for outputting and/or code for outputting as described with reference to FIG. 39.

In some aspects, the pair of beams comprises: a first beam for the at least one UE to use to communicate with the wireless node on the first link; and a second beam for the at least one UE to use to communicate with a second UE on the second link.

In some aspects, the method 3700 further includes outputting, for transmission on the first link, a signal. In some cases, the operations of this step refer to, or may be performed by, circuitry for outputting and/or code for outputting as described with reference to FIG. 39.

In some aspects, the method 3700 further includes obtaining, on the second link, a signal. In some cases, the operations of this step refer to, or may be performed by, circuitry for obtaining and/or code for obtaining as described with reference to FIG. 39.

In some aspects, the second UE is IC or OOC of the wireless node.

In some aspects, the at least one UE comprises a first UE and at least a second UE, and the pair of beams comprises: a first beam for the first UE to use for transmission to the second UE on the first link; and a second beam for the first UE to use for reception from the second UE on the second link.

In some aspects, the information comprises at least one of: a SI measurement; a CLI measurement; a SINR measurement; a RSRP measurement; a RSSI measurement; a candidate beam ID; or an ID of a second UE associated with at least one of the candidate beams.

In some aspects, the at least one report is at least one of: periodically scheduled; semi-persistently scheduled; aperiodically scheduled; or event triggered.

In some aspects, the method 3700 further includes outputting, for transmission, a request for at least one of: the at least one report; or measurement information regarding the candidate beams. In some cases, the operations of this step refer to, or may be performed by, circuitry for outputting and/or code for outputting as described with reference to FIG. 39.

In some aspects, the request indicates at least one of: a candidate beam pair to include in the report; a candidate beam pair to perform measurements for; a measurement type; a beam ID; or time and frequency resources for measurement.

In some aspects, the report indicates at least one measurement performed by a second UE.

In some aspects, the method 3700 further includes scheduling at least one transmission associated with the at least one UE, wherein the at least one report further indicates one or more measurements of the at least one transmission. In some cases, the operations of this step refer to, or may be performed by, circuitry for scheduling and/or code for scheduling as described with reference to FIG. 39.

In some aspects, the method 3700 further includes outputting, for transmission, an indication of resources associated with the scheduled at least one transmission. In some cases, the operations of this step refer to, or may be performed by, circuitry for outputting and/or code for outputting as described with reference to FIG. 39.

Figure 39:
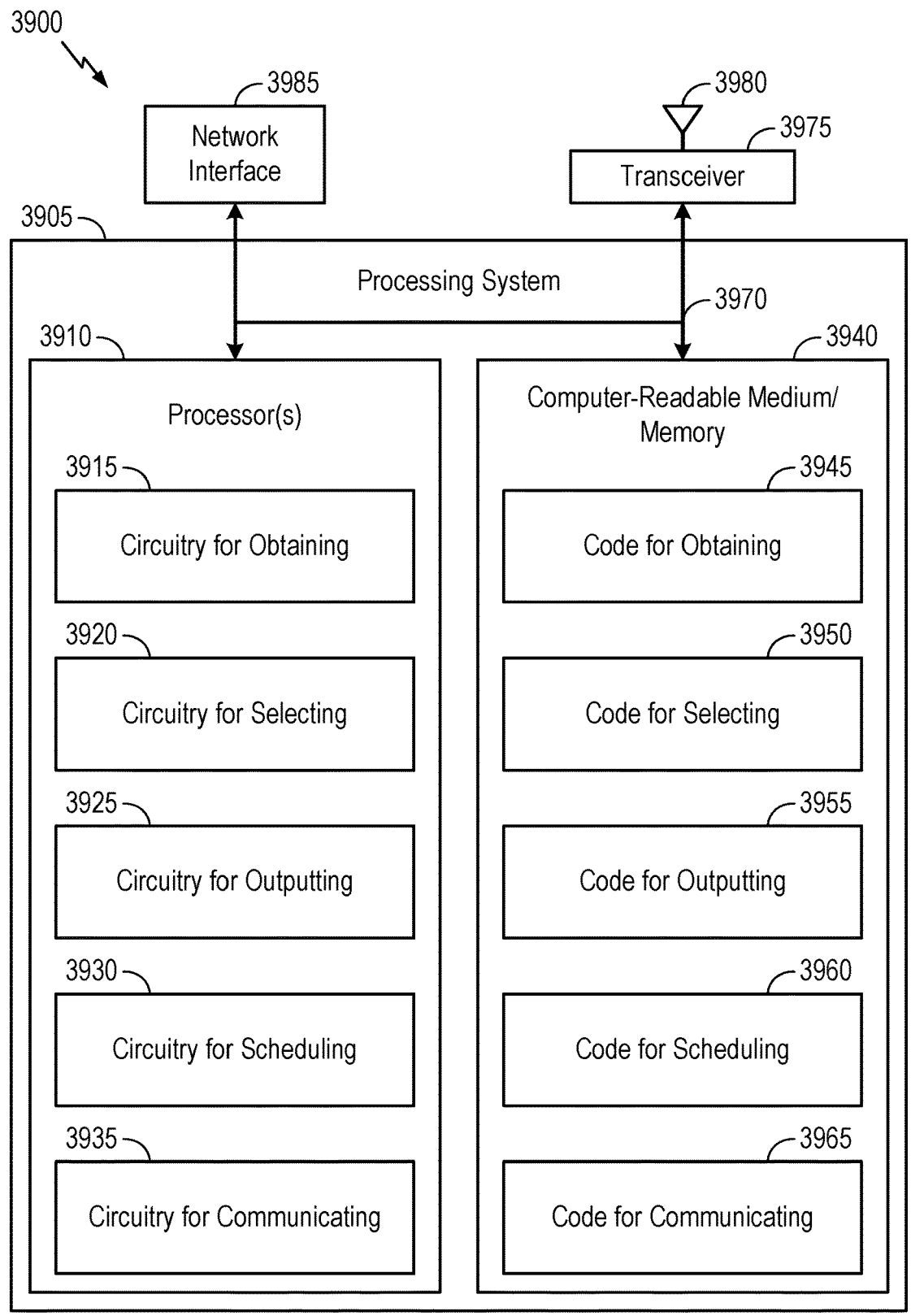
FIG. 39 depicts aspects of an example communications device.

In one aspect, method 3700, or any aspect related to it, may be performed by an apparatus, such as communications device 3900 of FIG. 39, which includes various components operable, configured, or adapted to perform the method 3700. Communications device 3900 is described below in further detail.

Note that FIG. 37 is just one example of a method, and other methods including fewer, additional, or alternative steps are possible consistent with this disclosure.

Figure 38:
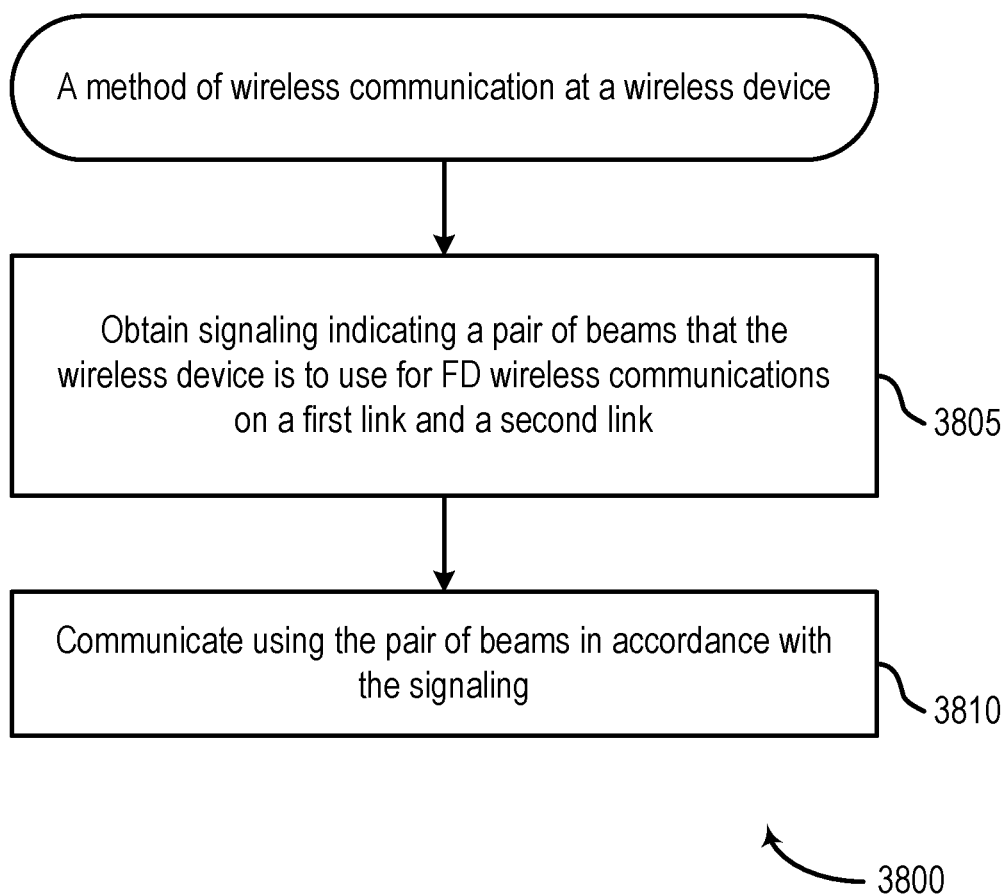
FIG. 38 depicts a method for wireless communications.

FIG. 38 shows an example of a method 3800 of wireless communication at a wireless device, such as a UE 104 of FIGS. 1 and 3.

Method 3800 begins at step 3805 with obtaining signaling indicating a pair of beams that the wireless device is to use for FD wireless communications on a first link and a second link. In some cases, the operations of this step refer to, or may be performed by, circuitry for obtaining and/or code for obtaining as described with reference to FIG. 39.

Method 3800 then proceeds to step 3810 with communicating using the pair of beams in accordance with the signaling. In some cases, the operations of this step refer to, or may be performed by, circuitry for communicating and/or code for communicating as described with reference to FIG. 39.

In some aspects, the pair of beams comprises: a first beam for wireless device to use to communicate with a wireless node on the first link; and a second beam for the wireless device to use to communicate with a second wireless device on the second link.

In some aspects, the method 3800 further includes obtaining, on the first link, a signal. In some cases, the operations of this step refer to, or may be performed by, circuitry for obtaining and/or code for obtaining as described with reference to FIG. 39.

In some aspects, the method 3800 further includes outputting, for transmission on the second link, a signal. In some cases, the operations of this step refer to, or may be performed by, circuitry for outputting and/or code for outputting as described with reference to FIG. 39.

In some aspects, the second wireless device is IC or OOC of the wireless node.

In some aspects, the pair of beams comprises: a first beam for the wireless device to use for transmission to the second wireless device on the first link; and a second beam for the wireless device to use for reception from the second wireless device on the second link.

In some aspects, the information comprises at least one of: a SI measurement; a CLI measurement; a SINR measurement; a RSRP measurement; a RSSI measurement; a candidate beam ID; or an ID of a second wireless device associated with at least one of the candidate beams.

In some aspects, the at least one report is at least one of: periodically scheduled; semi-persistently scheduled; aperiodically scheduled; or event triggered.

In some aspects, the method 3800 further includes outputting, for transmission, at least one report indicating information regarding candidate beams. In some cases, the operations of this step refer to, or may be performed by, circuitry for outputting and/or code for outputting as described with reference to FIG. 39.

In some aspects, the method 3800 further includes obtaining a request for at least one of: the at least one report; or measurement information regarding the candidate beams. In some cases, the operations of this step refer to, or may be performed by, circuitry for obtaining and/or code for obtaining as described with reference to FIG. 39.

In some aspects, the request indicates at least one of: a candidate beam pair to include in the report; a candidate beam pair to perform measurements for; a measurement type; a beam ID; or time and frequency resources for measurement.

In some aspects, the report indicates at least one measurement performed by a second wireless device.

In some aspects, the at least one report further indicates one or more measurements of at least one scheduled transmission associated with the wireless device.

In some aspects, the method 3800 further includes obtaining an indication of resources associated with the at least one scheduled transmission. In some cases, the operations of this step refer to, or may be performed by, circuitry for obtaining and/or code for obtaining as described with reference to FIG. 39.

In one aspect, method 3800, or any aspect related to it, may be performed by an apparatus, such as communications device 3900 of FIG. 39, which includes various components operable, configured, or adapted to perform the method 3800. Communications device 3900 is described below in further detail.

Note that FIG. 38 is just one example of a method, and other methods including fewer, additional, or alternative steps are possible consistent with this disclosure.

Example Communications Device

FIG. 39 depicts aspects of an example communications device 3900. In some aspects, communications device 3900 is a user equipment, such as UE 104 described above with respect to FIGS. 1 and 3. In some aspects, communications device 3900 is a network entity, such as BS 102 of FIGS. 1 and 3, or a disaggregated base station as discussed with respect to FIG. 2.

The communications device 3900 includes a processing system 3905 coupled to the transceiver 3975 (e.g., a transmitter and/or a receiver). In some aspects (e.g., when communications device 3900 is a network entity), processing system 3905 may be coupled to a network interface 3985 that is configured to obtain and send signals for the communications device 3900 via communication link(s), such as a backhaul link, midhaul link, and/or fronthaul link as described herein, such as with respect to FIG. 2. The transceiver 3975 is configured to transmit and receive signals for the communications device 3900 via the antenna 3980, such as the various signals as described herein. The processing system 3905 may be configured to perform processing functions for the communications device 3900, including processing signals received and/or to be transmitted by the communications device 3900.

The processing system 3905 includes one or more processors 3910. In various aspects, the one or more processors 3910 may be representative of one or more of receive processor 358, transmit processor 364, TX MIMO processor 366, and/or controller/processor 380, as described with respect to FIG. 3. In various aspects, one or more processors 3910 may be representative of one or more of receive processor 338, transmit processor 320, TX MIMO processor 330, and/or controller/processor 340, as described with respect to FIG. 3. The one or more processors 3910 are coupled to a computer-readable medium/memory 3940 via a bus 3970. In certain aspects, the computer-readable medium/memory 3940 is configured to store instructions (e.g., computer-executable code) that when executed by the one or more processors 3910, cause the one or more processors 3910 to perform the method 3700 described with respect to FIG. 37, or any aspect related to it; and the method 3800 described with respect to FIG. 38, or any aspect related to it. Note that reference to a processor performing a function of communications device 3900 may include one or more processors 3910 performing that function of communications device 3900.

In the depicted example, computer-readable medium/memory 3940 stores code (e.g., executable instructions), such as code for obtaining 3945, code for selecting 3950, code for outputting 3955, code for scheduling 3960, and code for communicating 3965. Processing of the code for obtaining 3945, code for selecting 3950, code for outputting 3955, code for scheduling 3960, and code for communicating 3965 may cause the communications device 3900 to perform the method 3700 described with respect to FIG. 37, or any aspect related to it; and the method 3800 described with respect to FIG. 38, or any aspect related to it.

The one or more processors 3910 include circuitry configured to implement (e.g., execute) the code stored in the computer-readable medium/memory 3940, including circuitry for obtaining 3915, circuitry for selecting 3920, circuitry for outputting 3925, circuitry for scheduling 3930, and circuitry for communicating 3935. Processing with circuitry for obtaining 3915, circuitry for selecting 3920, circuitry for outputting 3925, circuitry for scheduling 3930, and circuitry for communicating 3935 may cause the communications device 3900 to perform the method 3700 described with respect to FIG. 37, or any aspect related to it; and the method 3800 described with respect to FIG. 38, or any aspect related to it.

Various components of the communications device 3900 may provide means for performing the method 3700 described with respect to FIG. 37, or any aspect related to it; and the method 3800 described with respect to FIG. 38, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 3975 and the antenna 3980 of the communications device 3900 in FIG. 39. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 3975 and the antenna 3980 of the communications device 3900 in FIG. 39.

Means for obtaining, means for selecting, means for outputting, means for scheduling, and means for communication may include any of the various processors and/or transceivers shown in FIG. 3 or 39.

Example Clauses

Implementation examples are described in the following numbered clauses:

Clause 1: A method of wireless communication at a wireless node, comprising: obtaining at least one report indicating information regarding candidate beams; selecting, from the candidate beams, a pair of beams based on the information; and outputting, for transmission, signaling indicating that at least one UE is to use the pair of beams for FD wireless communications on a first link and a second link.

Clause 2: The method of Clause 1, wherein the pair of beams comprises: a first beam for the at least one UE to use to communicate with the wireless node on the first link; and a second beam for the at least one UE to use to communicate with a second UE on the second link.

Clause 3: The method of Clause 2, further comprising outputting, for transmission on the first link, a signal.

Clause 4: The method of Clause 2, further comprising obtaining, on the second link, a signal.

Clause 5: The method of Clause 2, wherein the second UE is IC or OOC of the wireless node.

Clause 6: The method of any one of Clauses 1-5, wherein the at least one UE comprises a first UE and at least a second UE, and the pair of beams comprises: a first beam for the first UE to use for transmission to the second UE on the first link; and a second beam for the first UE to use for reception from the second UE on the second link.

Clause 7: The method of any one of Clauses 1-6, wherein the information comprises at least one of: a SI measurement;

a CLI measurement; a SINR measurement; a RSRP measurement; a RSSI measurement; a candidate beam ID; or an ID of a second UE associated with at least one of the candidate beams.

Clause 8: The method of any one of Clauses 1-7, wherein the at least one report is at least one of: periodically scheduled; semi-persistently scheduled; aperiodically scheduled; or event triggered.

Clause 9: The method of any one of Clauses 1-8, further comprising outputting, for transmission, a request for at least one of: the at least one report; or measurement information regarding the candidate beams.

Clause 10: The method of Clause 9, wherein the request indicates at least one of: a candidate beam pair to include in the report; a candidate beam pair to perform measurements for; a measurement type; a beam ID; or time and frequency resources for measurement.

Clause 11: The method of any one of Clauses 1-10, wherein the report indicates at least one measurement performed by a second UE.

Clause 12: The method of any one of Clauses 1-11, further comprising scheduling at least one transmission associated with the at least one UE, wherein the at least one report further indicates one or more measurements of the at least one transmission.

Clause 13: The method of Clause 12, further comprising outputting, for transmission, an indication of resources associated with the scheduled at least one transmission.

Clause 14: A method of wireless communication at a wireless node, comprising: obtaining signaling indicating a pair of beams that the wireless device is to use for FD wireless communications on a first link and a second link; and communicating using the pair of beams in accordance with the signaling.

Clause 15: The method of Clause 14, wherein the pair of beams comprises: a first beam for wireless device to use to communicate with a wireless node on the first link; and a second beam for the wireless device to use to communicate with a second wireless device on the second link.

Clause 16: The method of Clause 15, further comprising obtaining, on the first link, a signal.

Clause 17: The method of Clause 15, further comprising outputting, for transmission on the second link, a signal.

Clause 18: The method of Clause 15, wherein the second wireless device is IC or OOC of the wireless node.

Clause 19: The method of any one of Clauses 14-18, wherein the pair of beams comprises: a first beam for the wireless device to use for transmission to the second wireless device on the first link; and a second beam for the wireless device to use for reception from the second wireless device on the second link.

Clause 20: The method of any one of Clauses 14-19, wherein the information comprises at least one of: a SI measurement; a CLI measurement; a SINR measurement; a RSRP measurement; a RSSI measurement; a candidate beam ID; or an ID of a second wireless device associated with at least one of the candidate beams.

Clause 21: The method of any one of Clauses 14-20, wherein the at least one report is at least one of: periodically scheduled; semi-persistently scheduled; aperiodically scheduled; or event triggered.

Clause 22: The method of any one of Clauses 14-21, further comprising outputting, for transmission, at least one report indicating information regarding candidate beams.

Clause 23: The method of Clause 22, further comprising obtaining a request for at least one of: the at least one report; or measurement information regarding the candidate beams.

Clause 24: The method of Clause 23, wherein the request indicates at least one of: a candidate beam pair to include in the report; a candidate beam pair to perform measurements for; a measurement type; a beam ID; or time and frequency resources for measurement.

Clause 25: The method of any one of Clauses 14-24, wherein the report indicates at least one measurement performed by a second wireless device.

Clause 26: The method of any one of Clauses 14-25, wherein the at least one report further indicates one or more measurements of at least one scheduled transmission associated with the wireless device.

Clause 27: The method of Clause 26, further comprising obtaining an indication of resources associated with the at least one scheduled transmission.

Clause 28: An apparatus, comprising: a memory comprising executable instructions; and a processor configured to execute the executable instructions and cause the apparatus to perform a method in accordance with any one of Clauses 1-27.

Clause 29: An apparatus, comprising means for performing a method in accordance with any one of Clauses 1-27.

Clause 30: A non-transitory computer-readable medium comprising executable instructions that, when executed by a processor of an apparatus, cause the apparatus to perform a method in accordance with any one of Clauses 1-27.

Clause 31: A computer program product embodied on a computer-readable storage medium comprising code for performing a method in accordance with any one of Clauses 1-27.

A network entity, comprising: at least one transceiver, a memory comprising executable instructions; and a processor configured to execute the executable instructions and cause the network entity to perform a method in accordance with any one of Clauses 1-13, wherein the at least one transceiver is configured to at least one of receive the report or transmit the signaling.

A user equipment (UE), comprising: at least one transceiver, a memory comprising executable instructions; and a processor configured to execute the executable instructions and cause the UE to perform a method in accordance with any one of Clauses 14-27, wherein the at least one transceiver is configured to transmit the signaling.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications, comprising:
   at least one memory comprising instructions; and
   one or more processors configured to execute the instructions and cause the apparatus to:
      obtain at least one report indicating information regarding candidate beams;
      select, from the candidate beams, a pair of beams based on the information; and
      output, for transmission, signaling indicating that at least one user equipment (UE) is to use the pair of beams for full duplex (FD) wireless communications on a first link and a second link, wherein the pair of beams comprises:
         a first beam for the at least one UE to use to communicate with the apparatus on the first link, and
         a second beam for the at least one UE to use to communicate with a second UE on the second link.

2. The apparatus of claim 1, wherein the one or more processors are further configured to execute the instructions and cause the apparatus to at least one of:
   output, for transmission on the first link via the first beam, a signal; or
   obtain, on the second link via the second beam, a signal.

3. The apparatus of claim 1, wherein the second UE is in coverage (IC) or out of coverage (OOC) of the apparatus.

4. The apparatus of claim 1, wherein the information comprises at least one of:
   a self-interference (SI) measurement;
   a crosslink interference (CLI) measurement;
   a signal to interference and noise ratio (SINR) measurement;
   a reference signal (RS) receive power (RSRP) measurement;
   a reference signal strength indicator (RSSI) measurement;
   a candidate beam identifier (ID); or
   an ID of a second UE associated with at least one of the candidate beams.

5. The apparatus of claim 1, wherein the at least one report is at least one of:
   periodically scheduled;
   semi-persistently scheduled;
   aperiodically scheduled; or
   event triggered.

6. The apparatus of claim 1, wherein the one or more processors are further configured to execute the instructions and cause the apparatus to output, for transmission, a request for at least one of:
   the at least one report; or
   measurement information regarding the candidate beams.

7. The apparatus of claim 6, wherein the request indicates at least one of:
   a candidate beam pair to include in the at least one report;
   a candidate beam pair to perform measurements for;
   a measurement type;
   a beam identifier (ID); or
   time and frequency resources for measurement.

8. The apparatus of claim 1, wherein:
   the at least one report further indicates at least one measurement performed by a second UE, and
   the selection is further based on the at least one measurement.

9. The apparatus of claim 1, wherein the one or more processors are further configured to execute the instructions and cause the apparatus to schedule at least one transmission associated with the at least one UE, wherein:
the at least one report further indicates one or more measurements of the at least one transmission, and
the selection is further based on the one or more measurements.

10. The apparatus of claim 9, wherein the one or more processors are further configured to execute the instructions and cause the apparatus to output, for transmission, an indication of resources associated with the scheduled at least one transmission.

11. The apparatus of claim 1, further comprising at least one transceiver configured to receive the at least one report and transmit the signaling, wherein the apparatus is configured as a network entity.

12. An apparatus for wireless communications, comprising:
at least one memory comprising instructions; and
one or more processors configured to execute the instructions and cause the apparatus to:
obtain, from a wireless node, signaling indicating a pair of beams that the apparatus is to use for full duplex (FD) wireless communications on a first link and a second link; and
communicate using the pair of beams in accordance with the signaling, wherein the pair of beams comprises:
a first beam for the apparatus to use to communicate with the wireless node on the first link, and
a second beam for the apparatus to use to communicate with a user equipment (UE) on the second link.

13. The apparatus of claim 12, wherein the one or more processors are further configured to execute the instructions and cause the apparatus to at least one of:
obtain, on the first link via the first beam, a signal; or
output, for transmission on the second link, a signal.

14. The apparatus of claim 12, wherein the UE is in coverage (IC) or out of coverage (OOC) of the wireless node.

15. The apparatus of claim 12, wherein the pair of beams comprises:
a first beam for the apparatus to use for transmission to a wireless node on the first link; and
a second beam for the apparatus to use for reception from the wireless node on the second link.

16. The apparatus of claim 12, further comprising:
at least one transceiver configured to receive the signaling, wherein and the apparatus is configured as another UE.

17. The apparatus of claim 12, wherein the one or more processors are further configured to execute the instructions and cause the apparatus to output, for transmission, at least one report indicating information regarding candidate beams.

18. The apparatus of claim 17, wherein the information comprises at least one of:
a self-interference (SI) measurement;
a crosslink interference (CLI) measurement;
a signal to interference and noise ratio (SINR) measurement;
a reference signal (RS) receive power (RSRP) measurement;
a reference signal strength indicator (RSSI) measurement;
a candidate beam identifier (ID); or
an ID of the UE associated with at least one of the candidate beams.

19. The apparatus of claim 17, wherein the at least one report is at least one of:
periodically scheduled;
semi-persistently scheduled;
aperiodically scheduled; or
event triggered.

20. The apparatus of claim 17, wherein the one or more processors are further configured to execute the instructions and cause the apparatus to obtain a request for at least one of:
the at least one report; or
measurement information regarding the candidate beams.

21. The apparatus of claim 20, wherein the request indicates at least one of:
a candidate beam pair to include in the at least one report;
a candidate beam pair to perform measurements for;
a measurement type;
a beam identifier (ID); or
time and frequency resources for measurement.

22. The apparatus of claim 17, wherein the at least one report further indicates at least one measurement performed by a wireless device.

23. The apparatus of claim 17, wherein the at least one report further indicates one or more measurements of at least one scheduled transmission associated with the apparatus.

24. The apparatus of claim 23, wherein the one or more processors are further configured to execute the instructions and cause the apparatus to obtain an indication of resources associated with the at least one scheduled transmission.

25. An apparatus for wireless communications, comprising:
at least one memory comprising instructions; and
one or more processors configured to execute the instructions and cause the apparatus to:
obtain at least one report indicating information regarding candidate beams;
select, from the candidate beams, a pair of beams based on the information; and
output, for transmission, signaling indicating that at least one user equipment (UE) is to use the pair of beams for full duplex (FD) wireless communications on a first link and a second link, wherein:
the at least one UE comprises a first UE and at least a second UE, and
the pair of beams comprises a first beam for the first UE to use for transmission to the second UE on the first link and a second beam for the first UE to use for reception from the second UE on the second link.

26. The apparatus of claim 25, wherein the information comprises at least one of:
a self-interference (SI) measurement;
a crosslink interference (CLI) measurement;
a signal to interference and noise ratio (SINR) measurement;
a reference signal (RS) receive power (RSRP) measurement;
a reference signal strength indicator (RSSI) measurement;
a candidate beam identifier (ID); or
an ID of a second UE associated with at least one of the candidate beams.

27. The apparatus of claim 25, wherein the at least one report is at least one of:
periodically scheduled;
semi-persistently scheduled;
aperiodically scheduled; or
event triggered.

28. The apparatus of claim 25, wherein the one or more processors are further configured to execute the instructions and cause the apparatus to output, for transmission, a request for at least one of:
the at least one report; or
measurement information regarding the candidate beams.

29. The apparatus of claim 28, wherein the request indicates at least one of:
a candidate beam pair to include in the at least one report;
a candidate beam pair to perform measurements for;
a measurement type;
a beam identifier (ID); or
time and frequency resources for measurement.

30. The apparatus of claim 25, wherein:
the at least one report further indicates at least one measurement performed by a second UE, and
the selection is further based on the at least one measurement.

31. The apparatus of claim 25, wherein the one or more processors are further configured to execute the instructions and cause the apparatus to schedule at least one transmission associated with the at least one UE, wherein:
the at least one report further indicates one or more measurements of the at least one transmission, and
the selection is further based on the one or more measurements.

32. The apparatus of claim 31, wherein the one or more processors are further configured to execute the instructions and cause the apparatus to output, for transmission, an indication of resources associated with the scheduled at least one transmission.

33. The apparatus of claim 25, further comprising at least one transceiver configured to receive the at least one report and transmit the signaling, wherein the apparatus is configured as a network entity.

* * * * *